(12) United States Patent
Miller et al.

(10) Patent No.: US 7,457,844 B2
(45) Date of Patent: *Nov. 25, 2008

(54) CORRESPONDENT-CENTRIC MANAGEMENT EMAIL SYSTEM FOR ASSOCIATING MESSAGE IDENTIFIERS WITH INSTANCES OF PROPERTIES ALREADY STORED IN DATABASE

(75) Inventors: Stephen S. Miller, Pasadena, CA (US); Mohammed Shaalan, New York, NY (US); Lewis Ross, West Lawrence, NY (US)

(73) Assignee: Net Exchange LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/381,746

(22) Filed: May 5, 2006

(65) Prior Publication Data

US 2006/0195538 A1    Aug. 31, 2006

Related U.S. Application Data

(60) Division of application No. 10/613,875, filed on Jul. 3, 2003, now Pat. No. 7,386,591, which is a continuation of application No. 09/269,587, filed as application No. PCT/US98/14886 on Jul. 18, 1998, now Pat. No. 6,615,241.

(60) Provisional application No. 60/053,070, filed on Jul. 18, 1997.

(51) Int. Cl.
    *G06F 15/16* (2006.01)
(52) U.S. Cl. ...................... 709/206; 707/100

(58) Field of Classification Search ............... 709/206, 709/217, 218, 232, 103; 718/103; 358/402; 707/100

See application file for complete search history.

(56) References Cited

U.S. PATENT DOCUMENTS

| | | | | |
|---|---|---|---|---|
| 5,377,354 A | * | 12/1994 | Scannell et al. | ............. 718/103 |
| 5,548,789 A | * | 8/1996 | Nakanura | .................... 709/206 |
| 5,754,778 A | * | 5/1998 | Shoujima | .................... 709/206 |
| 5,754,788 A | * | 5/1998 | Beah et al. | .................. 709/232 |

(Continued)

OTHER PUBLICATIONS

Lee, Mike, Basic Groupwise Concepts for Support Professionals, Novell Support TechCenter, Jan. 1, 1996, 19 pages. Http://support.novell.com/techcenter/articles/ana19960102.html.

*Primary Examiner*—Le Luu
(74) *Attorney, Agent, or Firm*—Shemwell Mahamedi LLP

(57) ABSTRACT

Techniques to make e-mail correspondent-centric rather than message-centric, and reduce junk e-mail. Tabulates, maintains, and updates useful information about the user's chosen correspondents, and the history and status of each correspondence series. Filters incoming messages from an unrecognized sender, asking user whether to add sender to correspondent list, and if so prompts user for needed information. Eliminates the need to search for e-mail addresses. Facilitates viewing sequential messages to and from a correspondent. Provides an effective tool to eliminate junk-mail by making it simpler and more practical to screen messages or change one's e-mail address. When user changes his e-mail address, automates notification of user's chosen correspondents, and in some cases can automatically update such correspondents' e-mail address lists. Eliminates need to manually create and maintain mailboxes or folders. Allows automated organization of e-mail by correspondent. Is easier to learn and use than previous forms of e-mail.

8 Claims, 22 Drawing Sheets

U.S. PATENT DOCUMENTS

| | | | |
|---|---|---|---|
| 5,978,566 A * | 11/1999 | Plank et al. | 709/206 |
| 6,189,026 B1 * | 2/2001 | Birrell et al. | 709/206 |
| 6,314,456 B1 * | 11/2001 | Van Andel et al. | 709/218 |
| 6,377,978 B1 * | 4/2002 | Nguyen | 709/206 |
| 6,693,729 B1 * | 2/2004 | Bloomfield | 358/402 |

* cited by examiner

FIG. 3

CORRESPONDENT TABLE (CORRESPONDENT DATA STORE)

115 (n) or 215

| CORRESPONDENT NAME | E-MAIL ADDRESS | LINKS TO MSGS. IN MSG. DATABASE | # OF MESSAGES IN DATABASE | LAST MESSAGE TYPE (IN OR OUT) | DATE OF LAST CORRESPONDENCE |
|---|---|---|---|---|---|
| CORRESPONDENT 1 | ADDRESS FOR CORR. 1 | MSG. ID'S FOR CORR. 1 | # OF MSG.'S TO & FROM CORR. 1 | LAST MSG. STATUS, CORR. 1 | DATE FOR CORR. 1 |
| CORRESPONDENT 2 | ADDRESS FOR CORR. 2 | MSG. ID'S FOR CORR. 2 | # OF MSG.'S TO & FROM CORR. 2 | LAST MSG. STATUS, CORR. 2 | DATE FOR CORR. 2 |
| ... | ... | ... | ... | ... | ... |
| CORRESPONDENT n | ADDRESS FOR CORR. n | MSG. ID'S FOR CORR. n | # OF MSG.'S TO & FROM CORR. n | LAST MSG. STATUS, CORR. n | DATE FOR CORR. n |

INCOMING MESSAGE PROCESSING

| NXC.net | Your Personal NXC-Mail | Steve Miller's |
| net exchange | | Personal Intranet |

*Pending E-Mail*

| | From | Subject | Date | Time | Delete |
|---|---|---|---|---|---|
| 1. | Paul Smythe | Sheryl | 12/28 | 9:35a | ☐ |
| 2. | Randall Simpson | ISDN Problem | 12/28 | 1:05p | ☒ |
| 3. | *?ksmith223@aol.com | 970-555-5555 [Note-unrecognized sender] | 12/29 | 7:35p | ☐ |
| 4. | *?Rich Mellor (rmellor@msn.com) | [Note-unrecognized sender] | 12/29 | 11:29p | ☐ |
| 5. | Susan Nichols | Interesting investment | 12/30 | 10:35a | ☐ |

505 — *Delete Junk* (*Delete all above messages from unrecognized senders*)

| | |
|---|---|
| 507 — ☐ | Contact List and Past Correspondence (*find your contacts and past correspondences*) |
| 509 — ☐ | Change Your E-Mail Options (*eliminate junk e-mail, change your default settings, set the time period your messages will be saved, etc.*) |

Back to Welcome Page

Copyright Net Exchange, Inc. 1996. The Format, site structure, tables structure, and content of this page (excluding user data) is the exclusive property of Net Exchange, Inc. and cannot be used for any purpose except as authorized by Net Exchange, Inc.

| NXC.net net exchange | Mall - Paul Smythe | Steve Miller's Personal Intranet |
|---|---|---|

| To: | Steve Miller | 4/7/97;9:35a.m. |
|---|---|---|
| CC's: | Melissa Smith, Jerry Sternfield | Later Save Delete |
| Subject: | Stock Recommendation (3) | ◉ ○ ○ |

Steve – Thanks for the advice about that investment. It gained four points since you recommended it. Please let me know any other recommendations you have.

When can you and Jeanne meet us for dinner? – Paul

| To: | Paul Smythe |
|---|---|
| CC's: | Melissa Smith, Jerry Sternfield |
| Subject: | Stock Recommendation (4) |
| Response: | Dear Paul: |

Send

Past Correspondence with Paul Smythe

| To: | You; Jeremy Johnson | Tuesday |
|---|---|---|
| CC's: | Melissa Smith, Jerry Sternfield | 4/6/97-8:01a. |
| Subject: | Stock Recommendation (2) | Delete ☐ |

Check out XYZ stock. I've been following the industry, and I think there's some potential. I've bought several thousand shares for my own portfolio. – Jim

| To: | Paul Smythe | Tuesday |
|---|---|---|
| CC's: | Melissa Smith, Jerry Sternfield | 4/5/97-8:45p. |
| Subject: | Stock Recommendation | Delete ☐ |

Do you have any ideas about stock investments?

My wife just got some money to invest. I know you're an expert in technology stocks. Please let me know.

BTW, How's your son doing in school

Paul

*Earlier Correspondence*

| Sender | Subject | Date | Time | Delete |
|---|---|---|---|---|
| Paul Smythe | Hi!(2) | 12/19 | 10:45 | ☐ |

FIG. 6(b)

| You | Hi! | 12/15 | 12:05p | ☐ |
|---|---|---|---|---|
| You | I Moved | 12/13 | 10:05p | ☐ |
| Paul Smythe | (no subject) | 12/10 | 11:01p | ■ |
| You | Vacation | 12/08 | 1:25p | ☐ |

Back to Your Personal E-Mail or Welcome Page

Copyright Net Exchange, Inc. 1996. The Format, site structure, tables structure, and content of this page (excluding user data) is the exclusive property of Net Exchange, Inc. and cannot be used for any purpose except as authorized by Net Exchange, Inc.

| NXC.n t | Eliminate Junk-Mail | Steve Miller's |
|---|---|---|
| net exchange | | Personal Intranet |

This page lets you completely eliminate junk mail, by changing your e-mail address so that those who don't know your new address can no longer send you e-mail. However, since we keep track of all your e-mail contacts, we let you conveniently choose which contacts will have your new e-mail address.

For your continuing contacts who use NXC-mail provider, this change will be transparent – we make the adjustment to our database, and your contact needs take no action, and merely sends you e-mail as before.

For your contacts who don't use NXC-mail, we will send them a polite e-mail message from you (which you can review and edit), notifying them of your e-mail address change so they can update their e-mail software.

Instructions: After you press the "submit" button below, only the e-mail contacts checked below will have your new e-mail address. Click on a checkbox to uncheck any names whom you don't want to have your new NXC-mail address. To decide whether to uncheck a contact, you can click on the contact name to review your correspondance history with that contact. After you complete your choices, click on the "submit" button below.

| Last Name | 1st Name | E-mail Address | Last Msg. | In/Out | NXC Mail? | Inform ? |
|---|---|---|---|---|---|---|
| Austin | Allison | Allison.nyc.ny | 12/26 | In | Yes | X |
| Dougherty | Jim | jim4092@aol.com | 12/23 | Out | No | X |
| Grange | Beth | Beth.nyc.ny | 11/27 | In | Yes | X |
| Hardy | Dave | DH.nyc.ny | 11/3 | In | Yes | X |
| Johnson | Kim | Kim.slc.ut | 12/28 | Out | Yes | X |
| Johnson | William S. | BJohnson.nyc.ny | 12/18 | In | Yes | X |
| Mitchell | Ramona | RamonaM@ix.netcom.com | 12/29 | Out | No | X |
| Nichols | Sue | snichols195@aol.com | 12/28 | Out | No | X |
| Samuels | Jackie | jsamuels@harvard.edu | 12/28 | In | No | X |
| Smith | John R. | Smitty.ny.nyc | 12/15 | Out | Yes | X |
| Smythe | Paul | Paul.ny.nyc | 12/29 | Out | Yes | X |
| Stempler | Randall | randall@stempler.com | 12/27 | In | No | X |
| Williams | Ellen | EllenW@panix.com | 12/05 | In | No | X |

Submit  Erase Choices

Back to Change Your Personal NXC-Mail Options, or Summary

---

Copyright Net Exchange, Inc. 1996. The Format, site structure, tables structure, and content of this page (excluding user data) is the exclusive property of Net Exchange, Inc. and cannot be used for any purpose except as authorized by Net Exchange, Inc.

FIG. 8

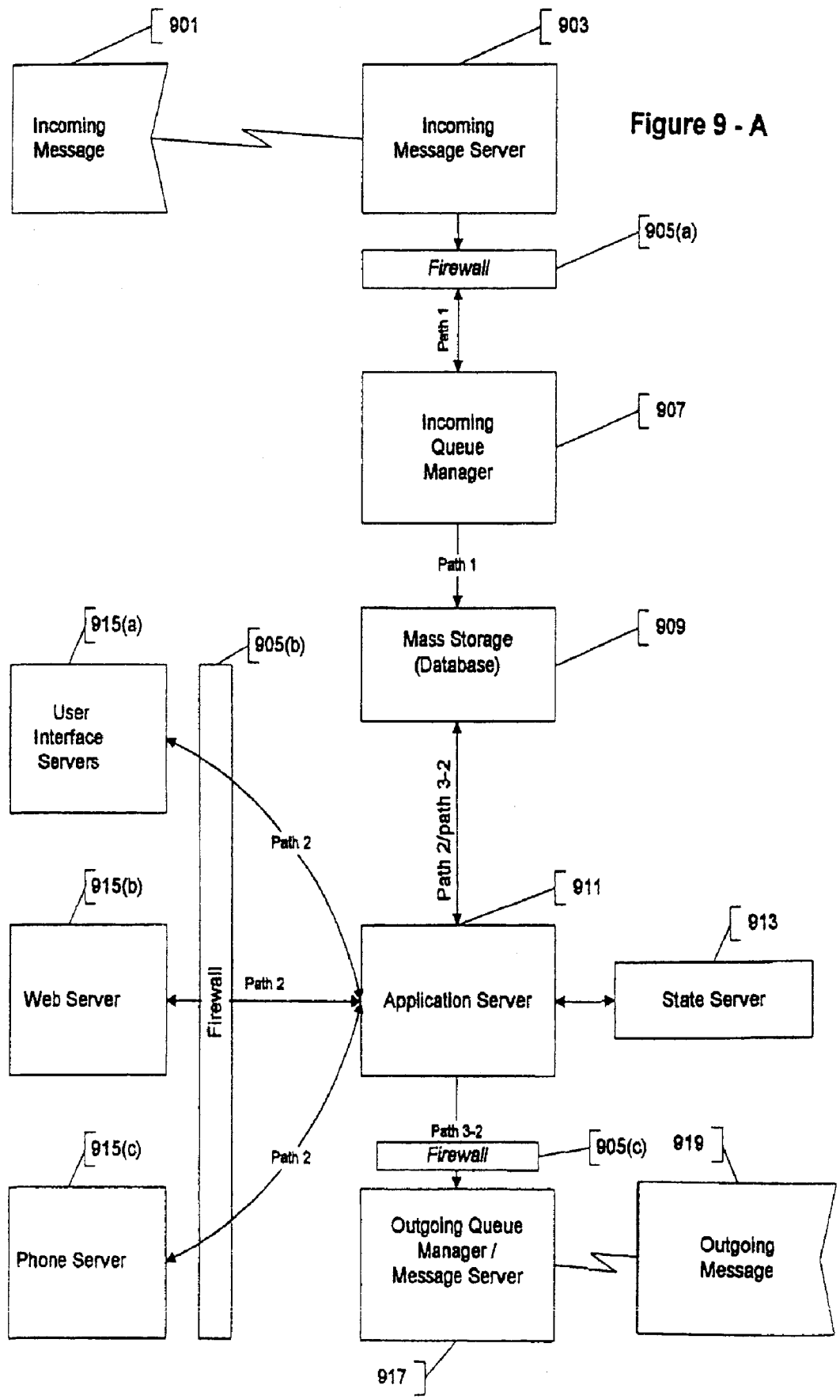
Figure 9 - A

Figure 9 - B
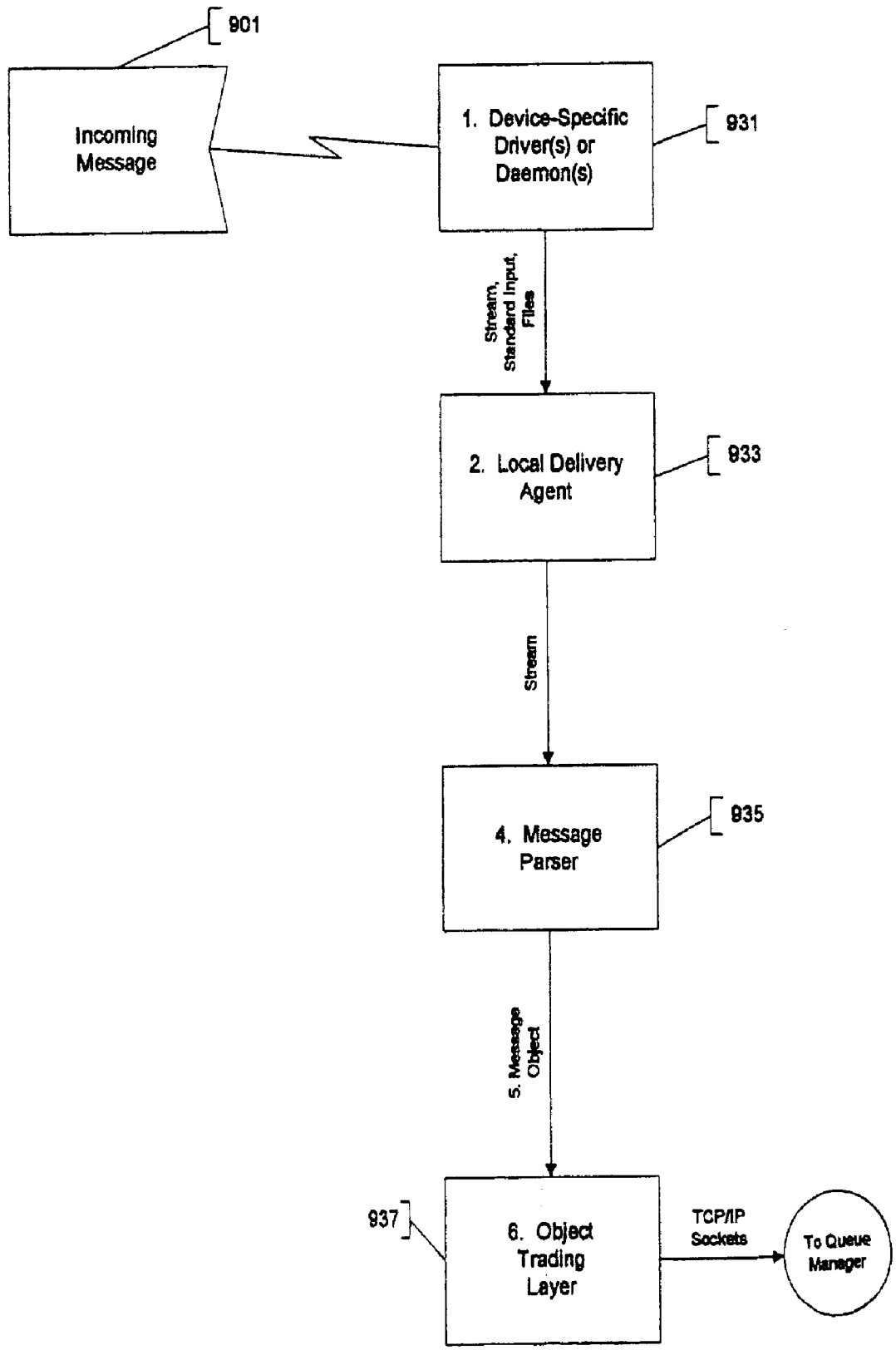

Figure 9 - C
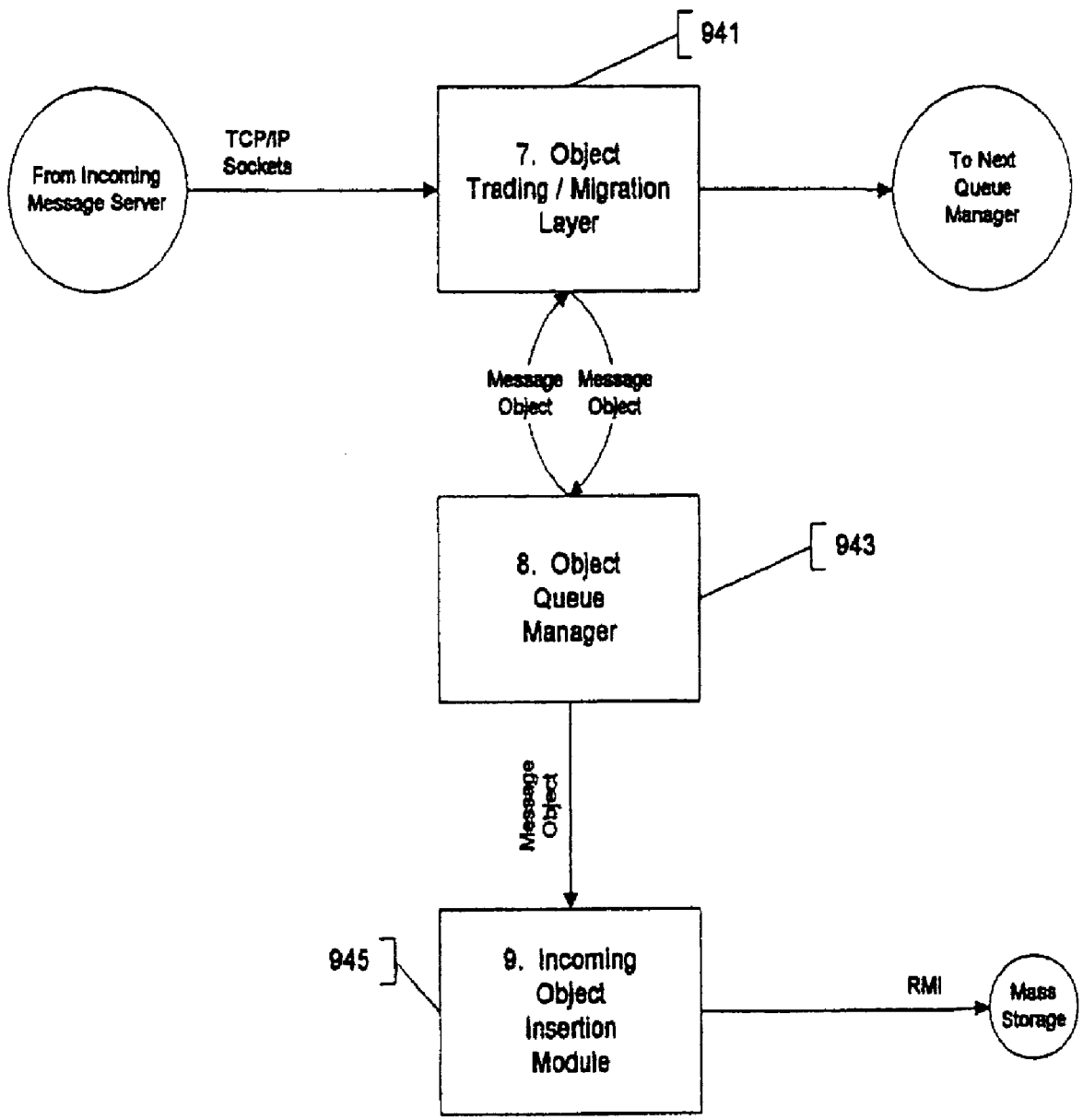

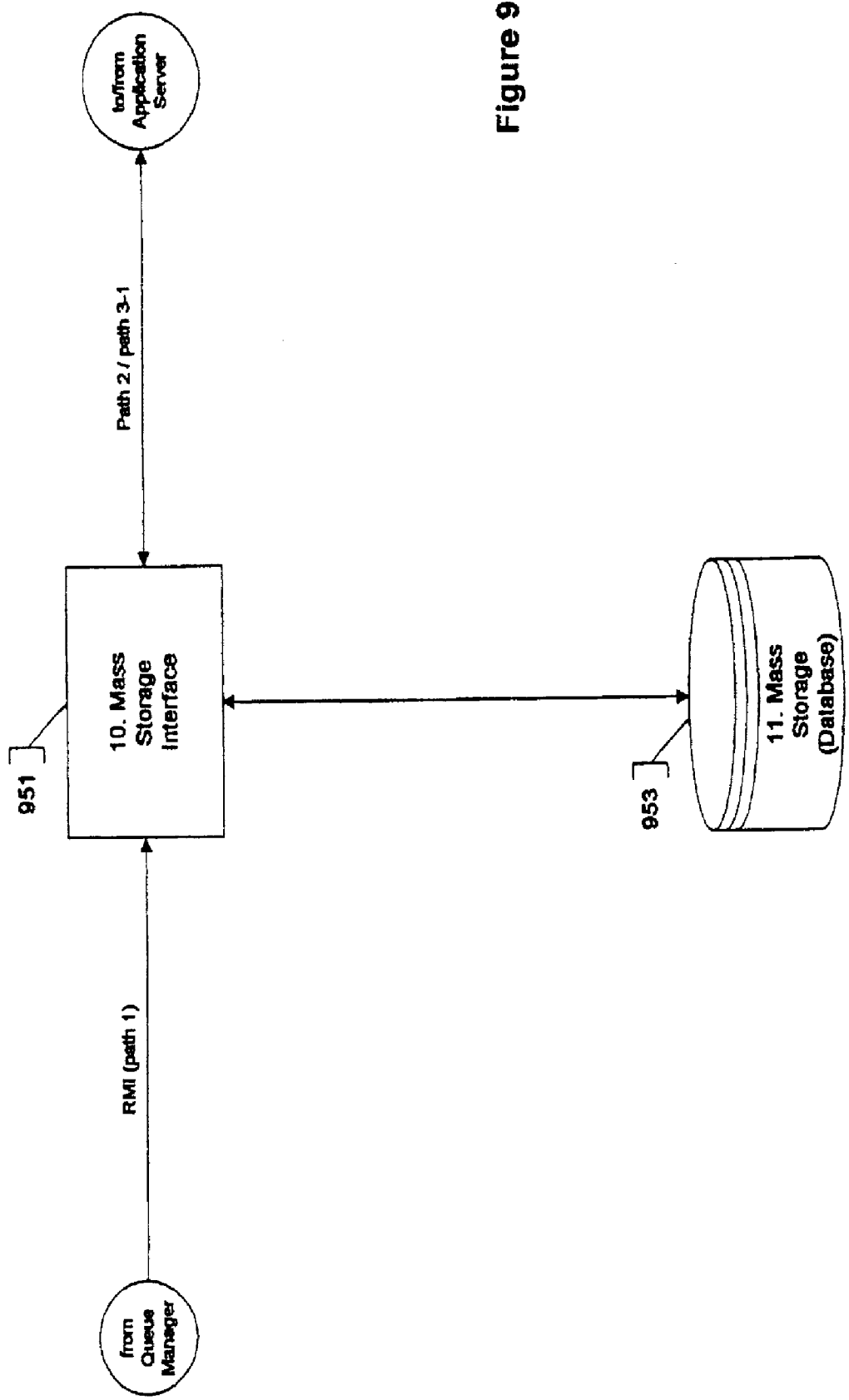
Figure 9 - D

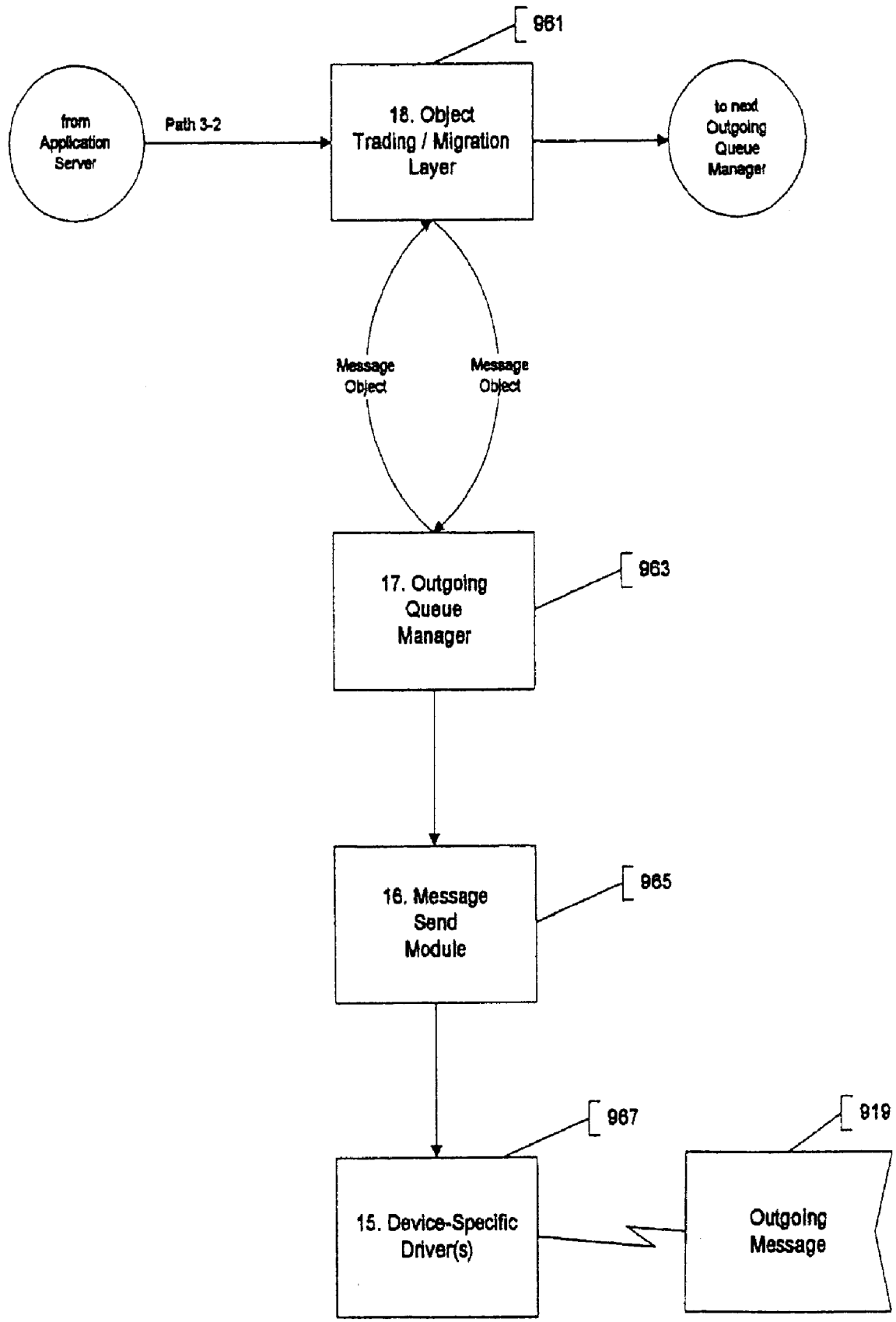
Figure 9 - E

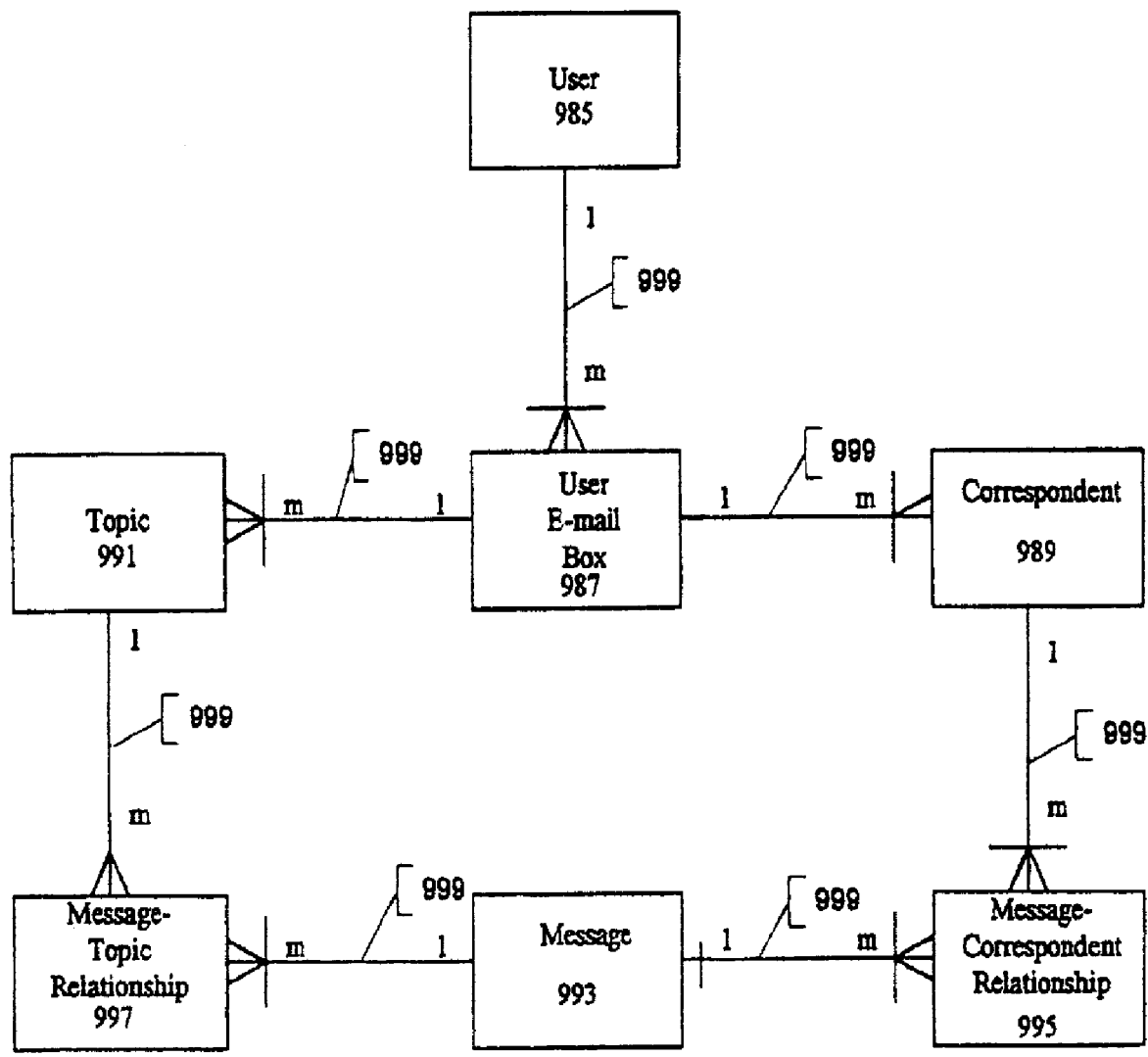
Figure 9 - F

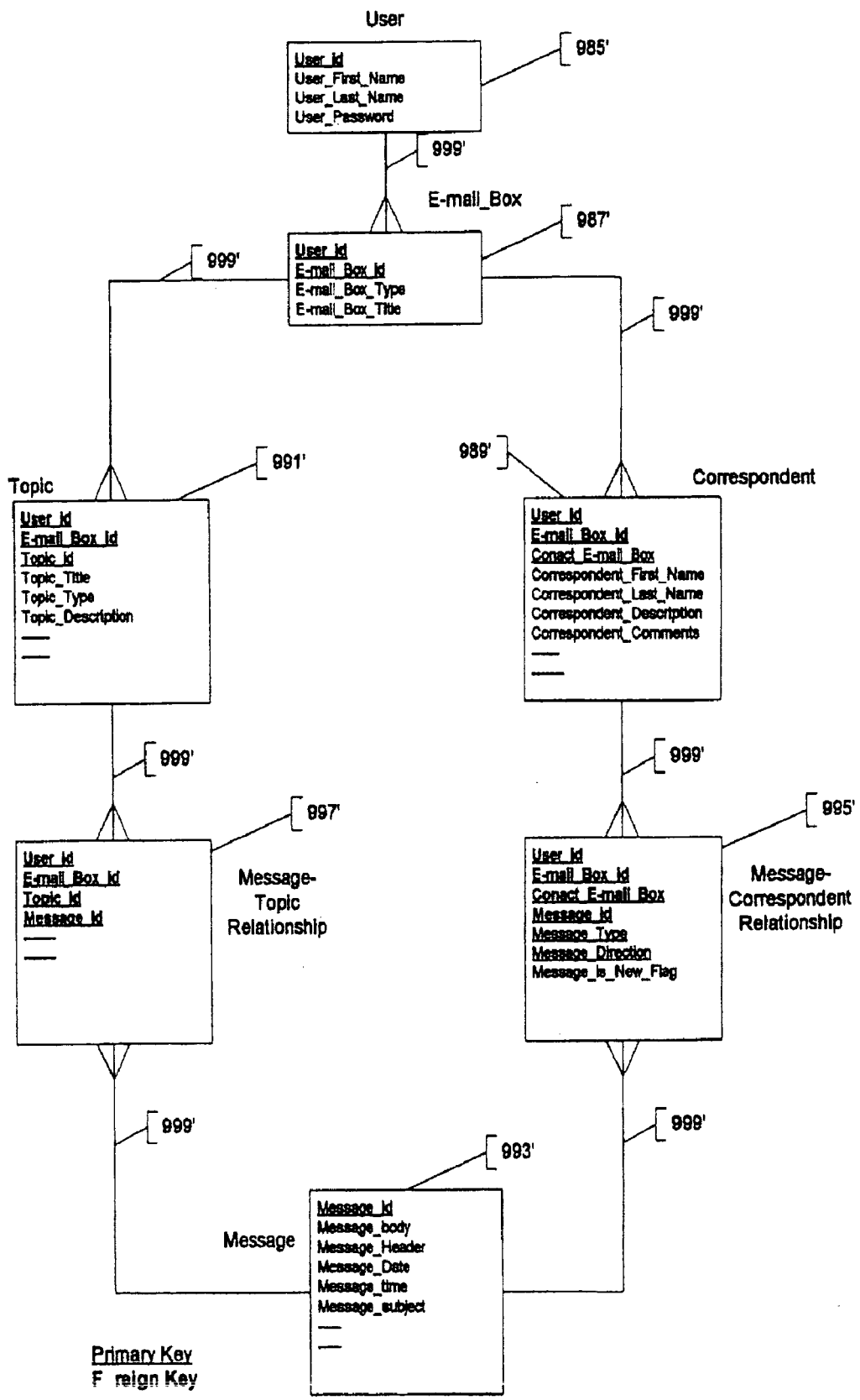
Figure 9 - G

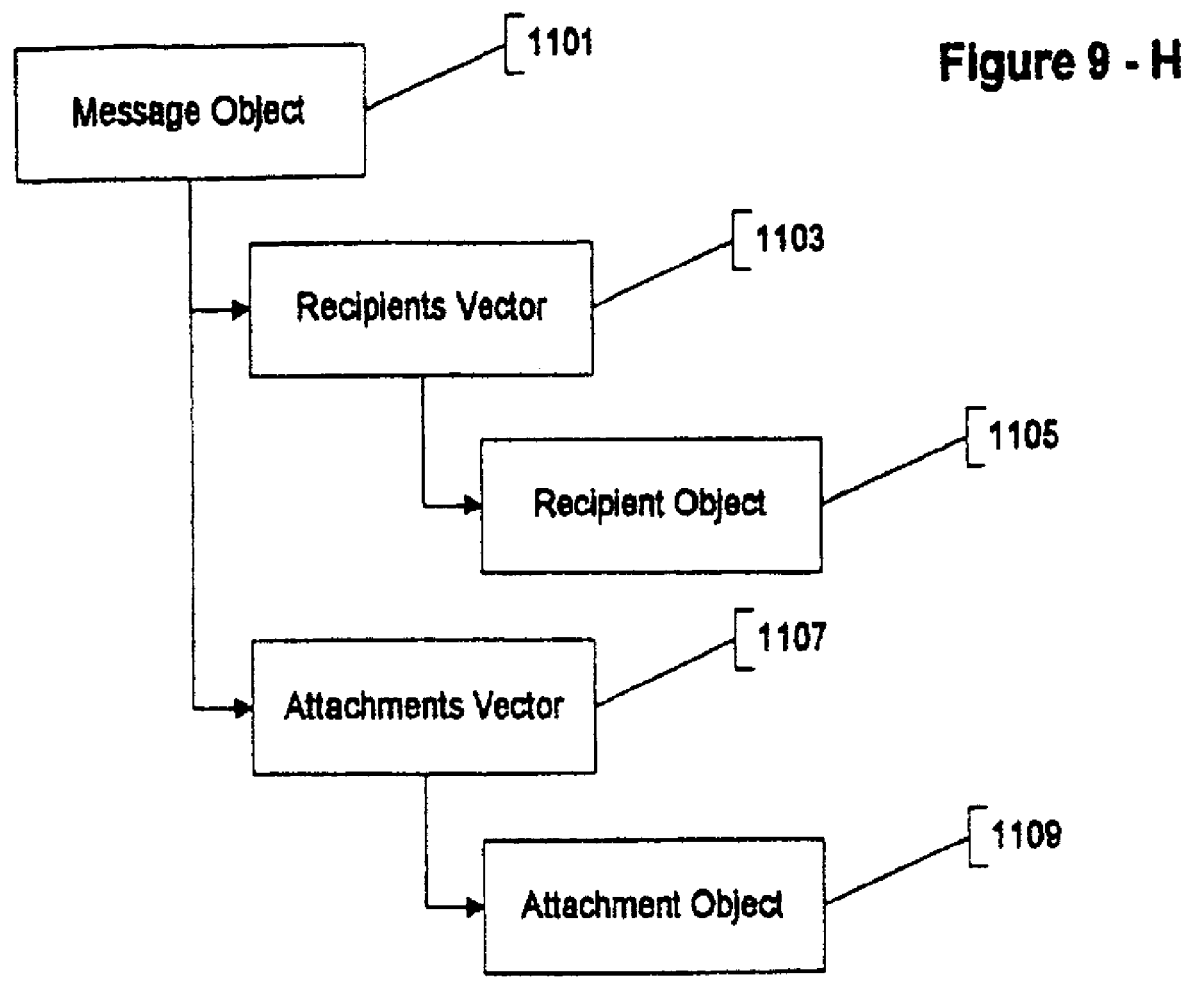
Figure 9 - H

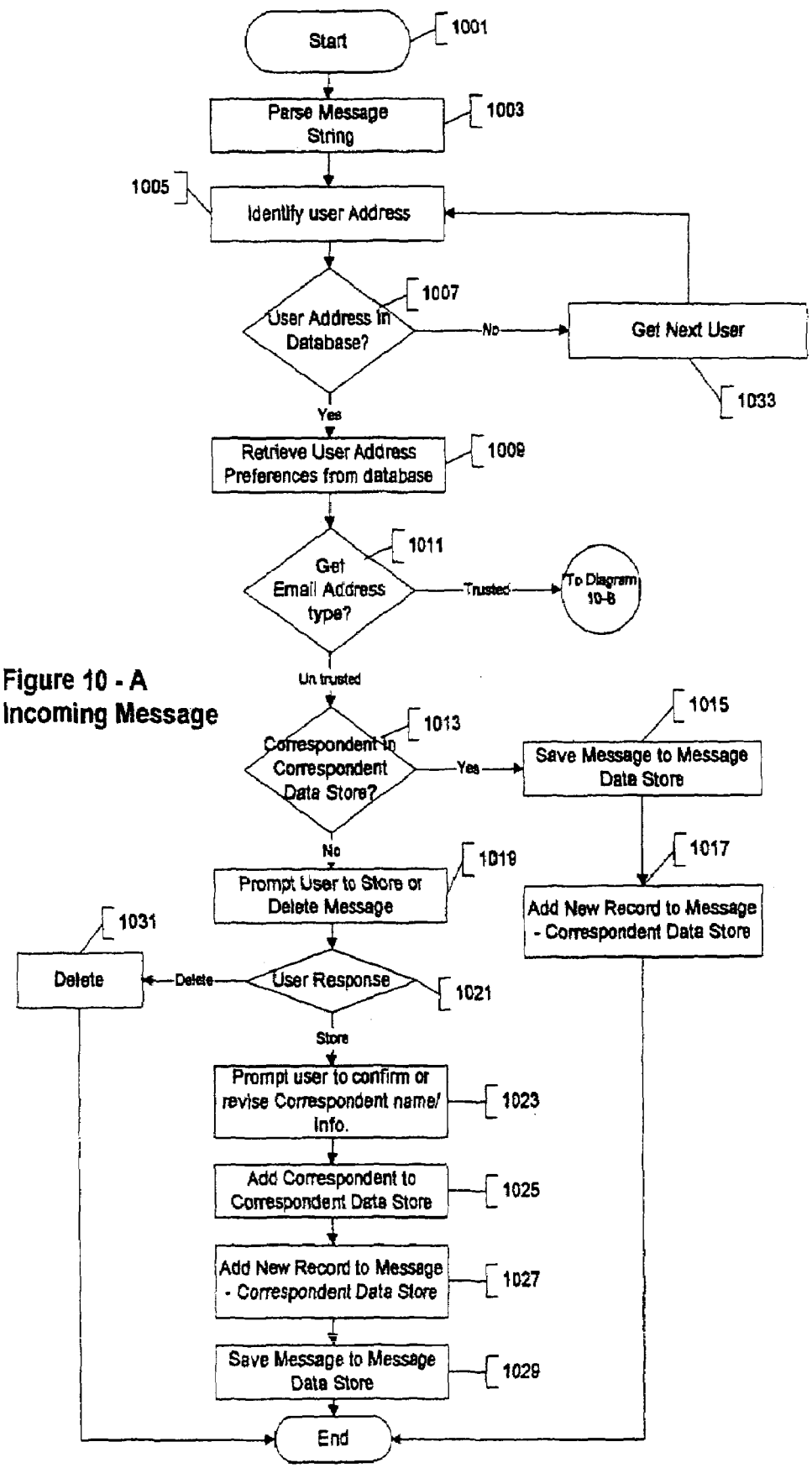

Figure 10 - B
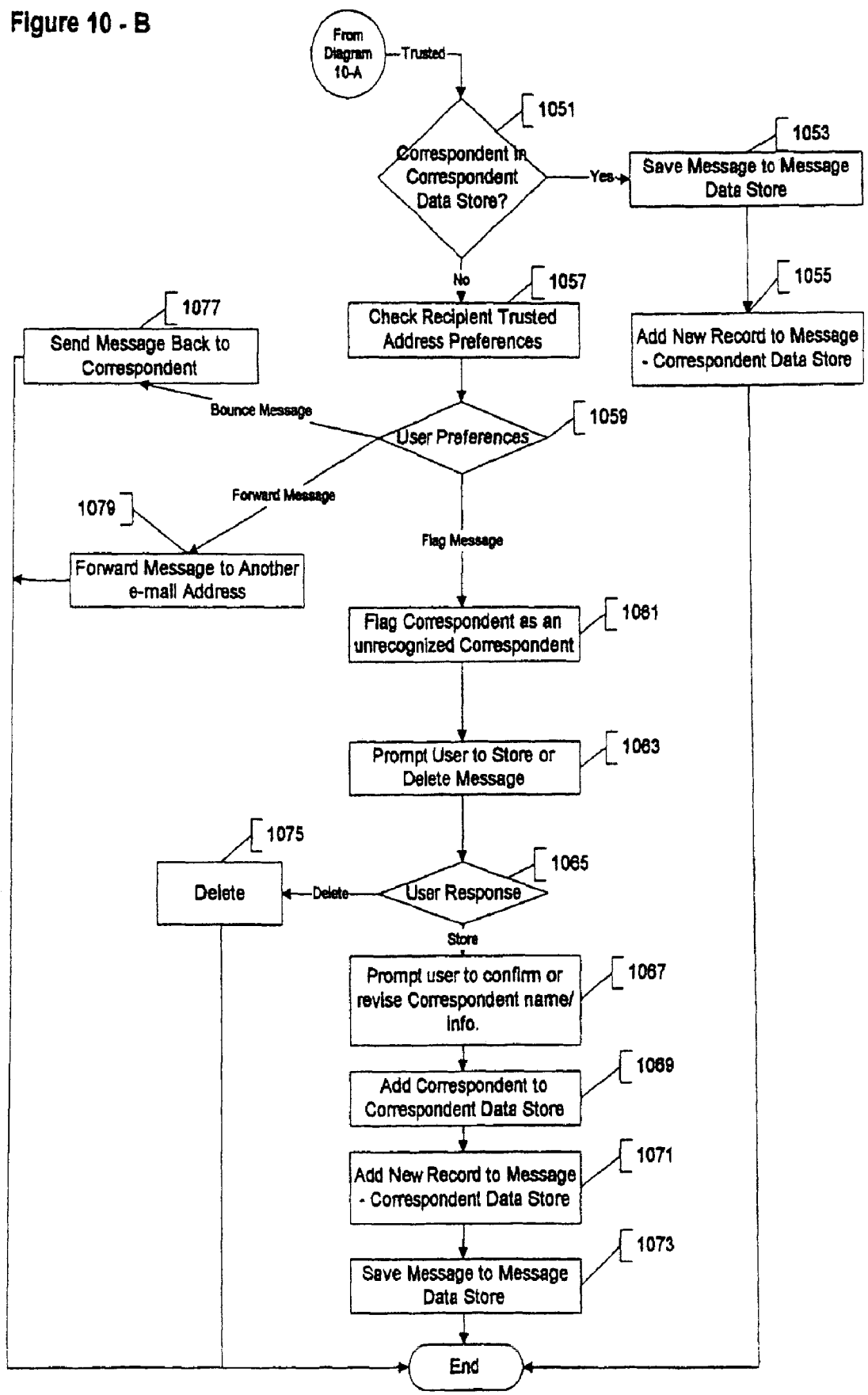

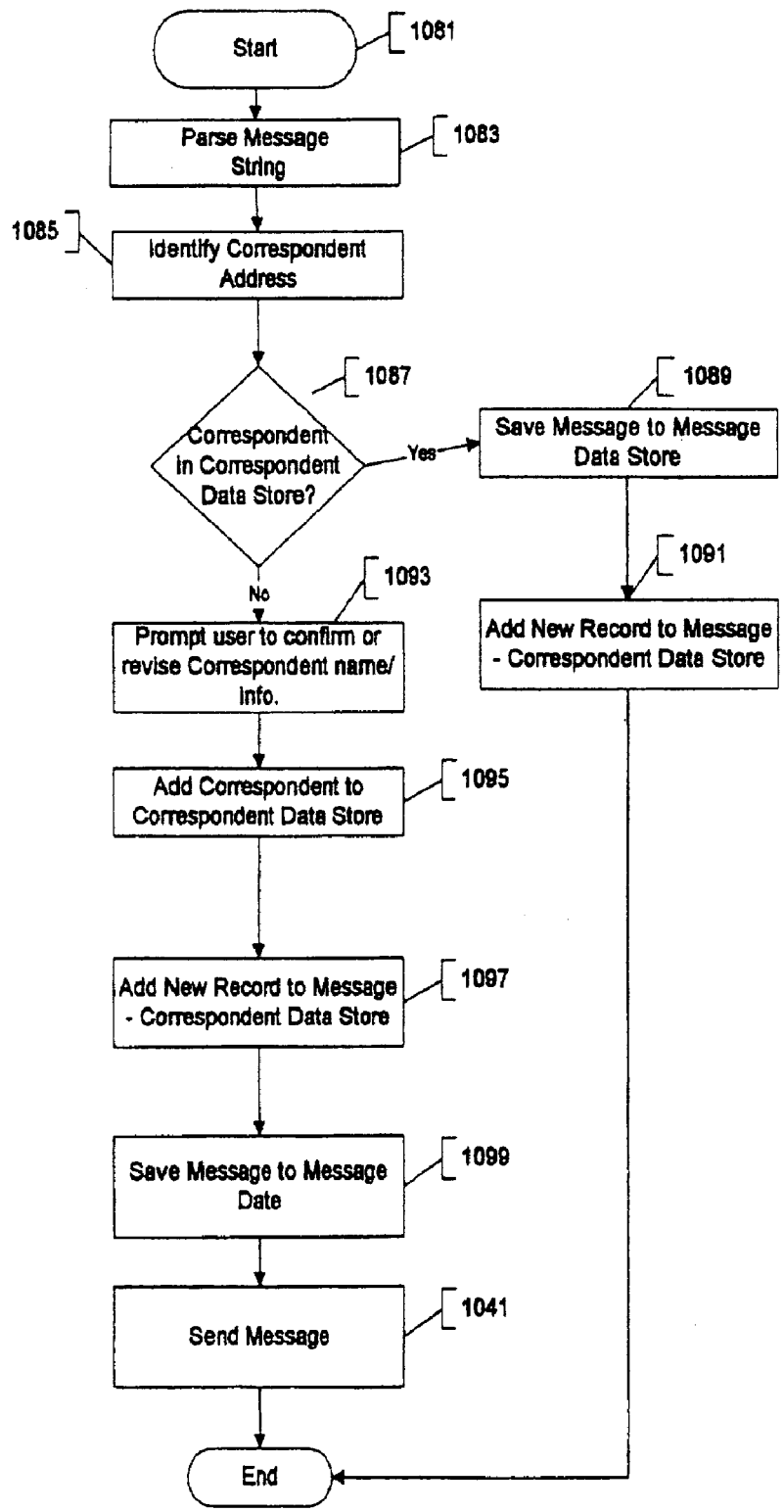
Figure 10 - C
Outgoing Message

Figure 11 A
Message Request

| Customer ID | - | Customer E-mail Address ID | - | Correspondent E-mail Address | - | Message ID |
|---|---|---|---|---|---|---|

1201

Figure 11 B
Correspondent Information Request

| Customer ID | - | Customer E-mail Address ID | - | Correspondent E-mail Address |
|---|---|---|---|---|

1203

Figure 11 C
Correspondent History Request

| Customer ID | - | Customer E-mail Address ID | - | Correspondent E-mail Address | - | Count1 | - | Count2 |
|---|---|---|---|---|---|---|---|---|

1205

Figure 11 D
Topic Contents Request

| Customer ID | - | Customer E-mail Address ID | - | Topic ID | - | Count1 | - | Count2 |
|---|---|---|---|---|---|---|---|---|

Mail Summary

Joe Smith

| Joe Smith's E-mail Addresses | Pending Mail | Correspondence Log |
|---|---|---|
| Trusted MailBox (JoeSmith@nrc.com) | 7 in, 3 new, 2 drafts | 2,082 msgs, 113 contacts |
| Untrusted MailBox (JS@nrc.com) | 4 in, 0 new, 1 draft | 195 msgs, 54 msgs |
| Suggestions (suggestions@domain.com) | 34 in, 1 new, 1 draft | 235 msgs, 44 msgs |
| Tech. Support (support@domain.com) | 4 in, 1 new, 1 draft | 135 msgs, 24 msgs |

Update This Page

CORRESPONDENT-CENTRIC MANAGEMENT EMAIL SYSTEM FOR ASSOCIATING MESSAGE IDENTIFIERS WITH INSTANCES OF PROPERTIES ALREADY STORED IN DATABASE

RELATED APPLICATIONS

This application is a divisional of U.S. patent application Ser. No. 10/613,875, filed Jul. 3, 2003; now U.S. Pat. No. 7,386,591 which is a continuation of U.S. patent application Ser. No. 09/269,587, filed Dec. 6, 1999, now U.S. Pat. No. 6,615,241 which is the National Stage of International Application No. PCT/US98/14886, filed Jul. 18, 1998, which claims the benefit of U.S. Provisional Patent Application No. 60/053,070, filed Jul. 18, 1997. The aforementioned parent applications are hereby incorporated by reference in their entirety.

FIELD OF THE INVENTION

This invention concerns electronic mail, and in particular a correspondent-centric way of organizing and processing e-mail to enhance setup, ease of use, convenience, storage, and functionality of e-mail. For end-users the invention simplifies and improves the management of messages and e-mail addresses, helps manage and reduce junk e-mail, and makes it easier to manage multiple mail-boxes. The invention also helps organizations set up and manage group e-mail systems with less effort and inconvenience, and at lower cost.

BACKGROUND OF THE INVENTION

E-mail is widely used today and its rapid growth is expected to continue. Over 70 million people use e-mail, sending over 200 million messages daily. Usage is expected to grow by 50% this year, with rapid growth projected for the foreseeable future.

However, despite e-mail's growing popularity, current e-mail systems have various drawbacks. These include the fact that e-mail systems are hard to use (particularly for non-technical users), that users are often plagued with excessive junk e-mail, and others drawbacks which will be described below.

The interface problems exist in part because the prior art for storing and displaying messages has evolved in a way that prevents users from readily monitoring key correspondence relationships. This prior art is based on a "message-centric" e-mail paradigm for storing e-mail and communicating information about e-mail to users.

By way of background, E-mail systems are generally either "client-server-based" or "host-based." In client-server systems messages are forwarded to the server, which stores them until the client logs in and downloads them for use and storage on the client (often the server continues to store messages after sending them to the client). In these systems most of the processing takes place on the client, with the server acting as a "store and forward" agent. Examples of client-server-based systems include typical Internet e-mail provided by Internet Service Providers (or "ISP's"), who use free server softwares such as Sendmail, or proprietary server softwares such as CC-Mail or Microsoft Exchange. Their customers handle their mail using client softwares such as Eudora, or the mail readers packaged with Web browsers such as Netscape Navigator or Microsoft Internet Explorer.

In host-based e-mail systems, on the other hand, messages are stored and processed on the server rather than the client. Examples of host-based systems include (1) main-frame e-mail systems (where users connect using "dumb terminals"), (2) private dial-in networks such as America On-line or Compuserve, and (3) Web-browser-based e-mail systems such as HotMail and Yahoo Mail.

The most widely used e-mail protocols today are POP3 and SMTP. POP3 ("Post Office Protocol 3", as specified in RFC 1725) is an interface standard designed to facilitate mail management locally on the user's e-mail device. Any POP3-compliant client can receive e-mail through a POP3-compliant e-mail server. (Note: a recent interface protocol, IMAP4-RFC 1730, is similar to POP3 except that it gives the client the option of sharing additional functionality with the server.) Likewise, SMTP (Simple Mail Transfer Protocol, as specified in RFC 821) is an interface used by e-mail servers to exchange messages with other servers. In order to exchange mail over the Internet, servers in both client-server and host-based e-mail systems must be SMTP-compliant.

POP3 and SMTP-based e-mail softwares create, send, and store e-mail in a standard format that does not lend itself to certain functions (that format is specified in RFC 822). These standard e-mail messages are self-contained strings of text, delimited into several standardized fields. Key fields in the messages text string include "header" information (e.g. sender's e-mail address, recipients' e-mail addresses, date/time sent, topic, etc.), and message "body". Other fields can be appended, but are principally useful only if sender's or receiver's e-mail system can recognize and use them.

These e-mail softwares store and let the user view these messages in a standard way, using designated files (also called "mailboxes" or "folders"). The default files are typically an "Inbox" and an "Outbox." When a user sends a message the software typically creates a message text string which it appends to the sender's "Out" file, then transmits the string over the network to the receiver's e-mail system, where the text string is appended to sender's "In" file. Users can create additional files (or "folders"), and can then move messages from the "In" or "Out" files to a new file, but this process typically requires manual effort or programming on the user's part.

In prior art systems it is hard to organize, find, and view useful information about one's correspondences. For example, end users can sort or view messages in only one file at a time (e.g. either the "In"-file or "Out"-file, but not both). Further, within a single file users can sort messages only by using a message field contained in the message itself (e.g. by date, topic, or sender's e-mail address). Users cannot reliably or readily view information pertaining to correspondence with a single correspondent, which information is usually contained in two or more files. For example, users cannot see summarized, compiled information about their correspondence history with any one correspondent, nor can they readily view a chronological correspondence sequence of incoming and outgoing mail between themselves and a specific correspondent. Further, sorting mail by sender e-mail address does not consistently link messages to correspondents, because the sender and receiver address fields allow many different text formats for messages sent to the same e-mail address.

Another problem with prior art systems is that they don't manage e-mail address lists well. Just as with handling of e-mail messages, the prior art handles e-mail address lists as flat files with no intelligent linking either to other e-mail address lists or to messages. Also, prior art e-mail address lists must be painstakingly created and managed by the user, rather than being automatically created based on correspondence.

The proliferation of junk e-mail is another problem with the prior art. Junk e-mail—often called "spam"—has lately become so pervasive that a Wall Street Journal article recently opined that spamming "has no foolproof solutions." Unfortunately, it is impossible to prevent spam by excluding messages from offending e-mailers, because spammers can easily fake their sender e-mail address. The prior art attempted to deal with spam by letting users create e-mail filters in their local e-mail system. Such a filter sorts incoming e-mail for the recipient into categories determined by the user. The filter simply scans each e-mail message as it reaches the recipient and determines what category it should be placed into. One category is, of course, "discard." Messages which the filter places in that category are automatically discarded. However, these filters have two disadvantages. First, they are hard to create, and consequently most e-mail user's don't bother to use them. Second, filters often filter out the good mail with the bad. For example, an employee survey sent by e-mail may request the user to indicate his or her sex.

The "message filtering technique" in U.S. Pat. No. 5,619, 648 to Canale et. al. Apr. 8, 1997, attempted to reduce junk e-mail. However, it offered an entirely different type of solution than the Invention. U.S. Pat. No. 5,619,648 relied on inserting additional information into the standard flat message file. It further required that all third-party users also use its invention, so that patent's application would only apply within closed loops of users.

Another frustration with the prior art is that it doesn't make it easy to own and use multiple e-mail addresses. Many current e-mail users have multiple e-mail addresses, but find it difficult to access them at the same time from a single access device.

Various problems plague organizational users of prior art e-mail systems. One problem is that these systems are hard to set up, and it is hard for users to easily link to other users within the organization.

Another problem with the prior art that plagues organizations is that the prior art consumes excessive computer storage space. This happens in two ways. First, prior art systems store each message on multiple computers. For example, if a user sends a message to one recipient, that message is stored in two to four places (e.g., in client-server systems, the message is stored on sender's client computer, recipient's client computer, and often on both sender's and receiver's server; in host-based systems, the server stores the message in a file for the sender and again in a file for the receiver). Further if a user addresses a message to ten people, then as many as 22 identical copies of that message may reside on the clients and servers of the sender and his addressees!

The second storage problem with the prior art happens when a user wants to file a message under more than one topic. The prior art does this by filing a copy of the message in each file (or folder) selected by the user. If a prior art user wants to store a message under ten topics, then ten copies of the message will be stored (and in the more recent IMAP4 systems as many as 20 copies of the message will be stored— 10 on the client and 10 on the server!).

The problems with the prior art exist because since the time of e-mail's development in the 1960's and early 1970's, e-mail has been based on the currently outdated "flat-file" database technology. Flat-file databases, also called also "non-relational" databases, store information as a simple series of "records", each containing identical "fields" of information (like subsequent rows a spreadsheet, each containing one field of information for each column of the spreadsheet). E-mail messages were structured as flat-file records—self-contained strings of text, delimited into various standardized fields. Key fields in each message's text string included "header" information (e.g. sender's e-mail address, recipient's e-mail address, date/time sent, topic, etc.), and message. Other fields could be appended, but were principally useful only if both the sender's and receiver's e-mail system could recognize and use them.

Prior art e-mail systems store, manage, and display e-mail messages in limited ways dictated by flat-file database architecture. These systems typically file e-mail messages two or more designated flat files (also called "mailboxes" or "folders"). A file contains a series of messages, each of which is analogous to a record, analogous to a "row" in a table or spreadsheet (as described above). The default files are typically "Inbox," and "Outbox," files. For example, when a user sends a message, his system typically creates a single string of text containing all the fields in the message, and appends this string to the the user's "Out" file. The system then transmits the string over the network to the recipient's e-mail system, where the text string is appended to the recipient's "In" file. Consequently, each user's In-box and Outbox grows longer and longer until the user does something with a message. Users can solve this problem by creating additional files (or "folders"), and can move messages from one folder to another. However, this approach takes thought and effort from the user.

In summary, some of the disadvantages of the prior art are:

1. It does not organize e-mail automatically - instead requires users to organize their e-mail manually; Inboxes and Outboxes grow large and unwieldy because messages are not automatically filed;

2. Hard to see on a single screen the chronological correspondence to and from a given correspondent;

3. Users cannot view on a single screen consolidated information about their correspondence history with multiple correspondents;

4. Hard to remember or find correspondents' e-mail addresses;

5. Doesn't remind users about key information triggers, such as whether the last correspondence with a party was incoming or outgoing, and which correspondences have lapsed.

6. Hard to find past messages;

7. Hard to view groups of past messages in meaningful ways;

8. Users can view messages from only one folder at a time;

9. Time consuming to set up, maintain, and use multiple e-mail address lists;

10. Hard to identify or screen junk e-mail;

11. Impractical to change one's e-mail address;

12. Problematic for an e-mail user to own and manage more than one e-mail address;

13. Users who own multiple e-mail addresses find it hard to move selected contacts and their related correspondence history from one e-mail address to another;

14. Hard to share access to a single e-mail address with others;

15. Hard for organizations to instantly set up an e-mail network for their constituents;

16. Hard for organizations to set up and maintain a single or multiple e-mail address lists for their constituents;

17. Hard for organizations to regulate access to organizational e-mail address lists.

18. Uses excess network storage space because duplicate copies of each message must be stored in multiple network locations;

19. Uses excess storage space on user's own computer, because duplicate copies of messages must be stored for each folder in which a message is filed;

In summary, the prior art provided a standard flat-file interface which has made it easier to write e-mail programs, but not easier to use them. Problems with prior art e-mail systems include the following: they are hard to use, don't manage messages in optimal ways, fail to manage e-mail addresses well, suffer from excess junk e-mail, make it difficult to manage multiple mailboxes, and are inconvenient for organizations to set up and maintain.

OBJECTS AND ADVANTAGES

The object of the invention is to provide a simple, easy-to-use, intuitive e-mail system with enhanced protections from junk e-mail, and which overcomes various drawbacks of prior art e-mail systems.

Accordingly, several objects of the invention are as follows:

1. View consolidated information about their correspondence history with all correspondents.
2. Easily view a chronological correspondence to and from a given correspondent.
3. Avoid the inconvenience of remembering or looking up e-mail addresses.
4. Eliminate or reduce junk e-mail by either screening incoming mail by correspondent, or conveniently changing one's e-mail address while simultaneously effecting the change in the systems of desired correspondents.
5. Have their e-mail organized automatically by the system, rather than having to organize it manually.
6. More easily be reminded about certain key information triggers, such as whether the last correspondence with a party was incoming or outgoing, and which correspondences have lapsed.

DESCRIPTION OF DRAWINGS

FIG. 3 is a diagram showing one example of a table structure for the correspondent data store used in the invention.

FIG. 5 is a user screen showing pending e-mail messages for a user using the preferred embodiment.

FIG. 6 is a user screen showing one of the forms of chronological correspondence with one correspondent, for the preferred embodiment.

FIG. 8 is a user screen showing the "Change E-mail Address" option for the preferred embodiment.

FIG. 9A is a high level system architecture diagram of the invention.

FIG. 9B is a functional block diagram of the internal structure of the incoming message server.

FIG. 9C is a functional block diagram of the queue manager server.

FIG. 9D is a functional block diagram of the internal structure of the mass storage server.

FIG. 9E is a functional block diagram illustrating the outgoing queue manager/message server.

FIGS. 9F and G illustrate respectively a generalized and a more particular diagram of the data tables comprising the mass storage and the relationships between the data tables.

FIG. 9H is an object relation diagram which illustrates the structure of the message object.

FIGS. 10A and B comprise together a flow diagram showing how an input message is processed.

FIG. 10C is a flow diagram showing how an output message to be transmitted is processed.

FIGS. 11A, B, C and D respectively illustrate the data structure of a request for retrieving a message, a correspondent information request, a correspondent message history request and a topic content request.

FIG. 12 is a table showing all of the correspondent addresses collected by a user, the past history of the messages from those correspondents and a summary of the pending messages.

SUMMARY OF THE INVENTION

The invention, therefore, compiles, updates, and displays additional summary information about a user's correspondence, and lets the user make decisions, take new actions, and enjoy new options facilitated by this new information. The invention allows a "correspondent-centric" user interface, to replace the "message-centric" interface imposed by the prior art.

This additional information also facilitates eliminating junk e-mail, by either (a) screening senders to determine which messages to accept, or (b) making it possible to readily change one's e-mail address without excessive inconvenience.

DESCRIPTION OF INVENTION

The following description begins with an overview of the invention and then describes in detail how the invention is implemented in apparatus to provide a user-friendly correspondent-centric interface and reduce junk e-mail.

Figure 1:
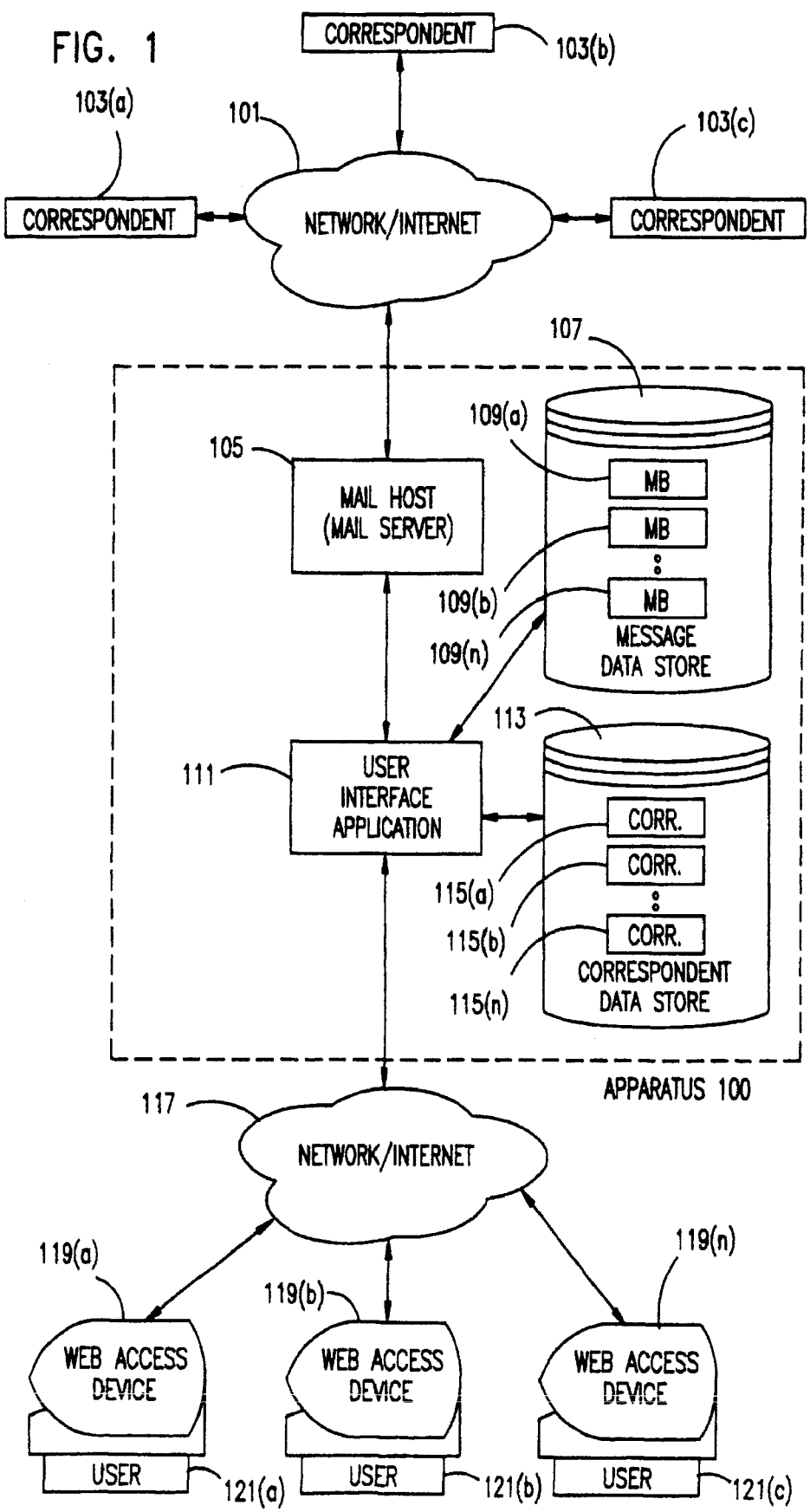
FIG. 1 shows a high-level block diagram of the apparatus for the preferred embodiment of the invention.

FIG. 1 shows a high-level overview of the preferred embodiment of the invention, and is shown as apparatus 100. This embodiment assumes that clients will access their e-mail through the Internet using a Web browser installed on any Internet access device. (This configuration will be further described below.)

Apparatus 100 is employed in network 101 which connects any number of e-mail users or correspondents 103 (*a* . . . *n*). Network 101 may be the Internet, a commercial e-mail network, or a privately owned network system. Each correspondent 103 is connected to network 101 by means of a link over which the correspondent 103 can send and receive e-mail messages. Mail or message items are sent by correspondents 103 to and from each other. Apparatus 100 allows users 121 (*a* . . . *n*) to send and receive e-mail messages of whatever type used in the network (typically internet mail standard messages).

When a new message is received by apparatus 100 from network 101, it is intercepted by mail host 105 (also called a mail server). Mail host 105 can be any computer configured as a mail server or mail host, having e-mail server software installed, such as Sendmail (for UNIX servers), other internet standard mail servers, or a proprietary mail server such as Lotus Notes, CC Mail, or Microsoft Exchange. When mail host 105 receives an incoming message from Network 101 it handles the message in the standard way, identifying the appropriate recipient. However, traditionally mail host 105 would post the message directly to the message data store 107, posting it in mailbox 109 (*a* . . . *n*) for the appropriate user 121 (*a* . . . *n*). In contrast in apparatus 100, mail host 105 sends the message to user interface application 111, which performs incoming message processing 300, (see FIG. 3). Based on the results of incoming message processing 300, user interface application 111 either deletes the message or stores it in the appropriate mailbox 109 (*a* . . . *n*). Subsequently user interface application 111 uses the new message information to update the appropriate correspondence table 115 (*a* . . . *n*) for the respective user 121 (*a* . . . *n*).

Users 121 (*a* . . . *n*) receive and send e-mail using Web access devices 119 (*a* . . . *n*). Web access devices 119 (*a* . . . *n*) can be any device enabled with "Web browser" software. Web browser software is any software which reads, displays, and allows user interaction with files written in "HTML" (Hypertext Markup Language), in conformance with "HTTP" (Hypertext Transfer Protocol). Examples of Web browser software include Netscape Navigator 3.0, Microsoft Internet Explorer 3.0, America On Line software 3.0, and the software installed on WebTV units. Web access device 119 (*a* . . . *n*) would have a terminal, monitor, or viewing screen, a CPU, RAM memory, a keyboard or other input device, and optionally a hard disk. The Web access device would be linked to the Internet or a proprietary network through a modem, ethernet card or other network link. Web access devices 119 (*a* . . . *n*) could be a personal computers, network computers, televisions with WebTV units attached, Web telephones, or other Web access devices which are currently being developed.

When an e-mail user uses apparatus 100 to access his e-mail, he will use his Web browser to link to apparatus 100 through Network/Internet 117. When he links to user interface application 111 he will see, using his web browser software, an interface which combines information from message data store 107 with correspondent data store 113. This combination allows novel views of e-mail such as those shown in FIGS. 5-8.

When an e-mail user uses apparatus 100 to send an e-mail message, the message is posted to message data store 107, and in addition, information from the message is used to update correspondent data store 113. The message is then sent to the appropriate recipient through either network 101 or network 117, as appropriate.

Figure 2:
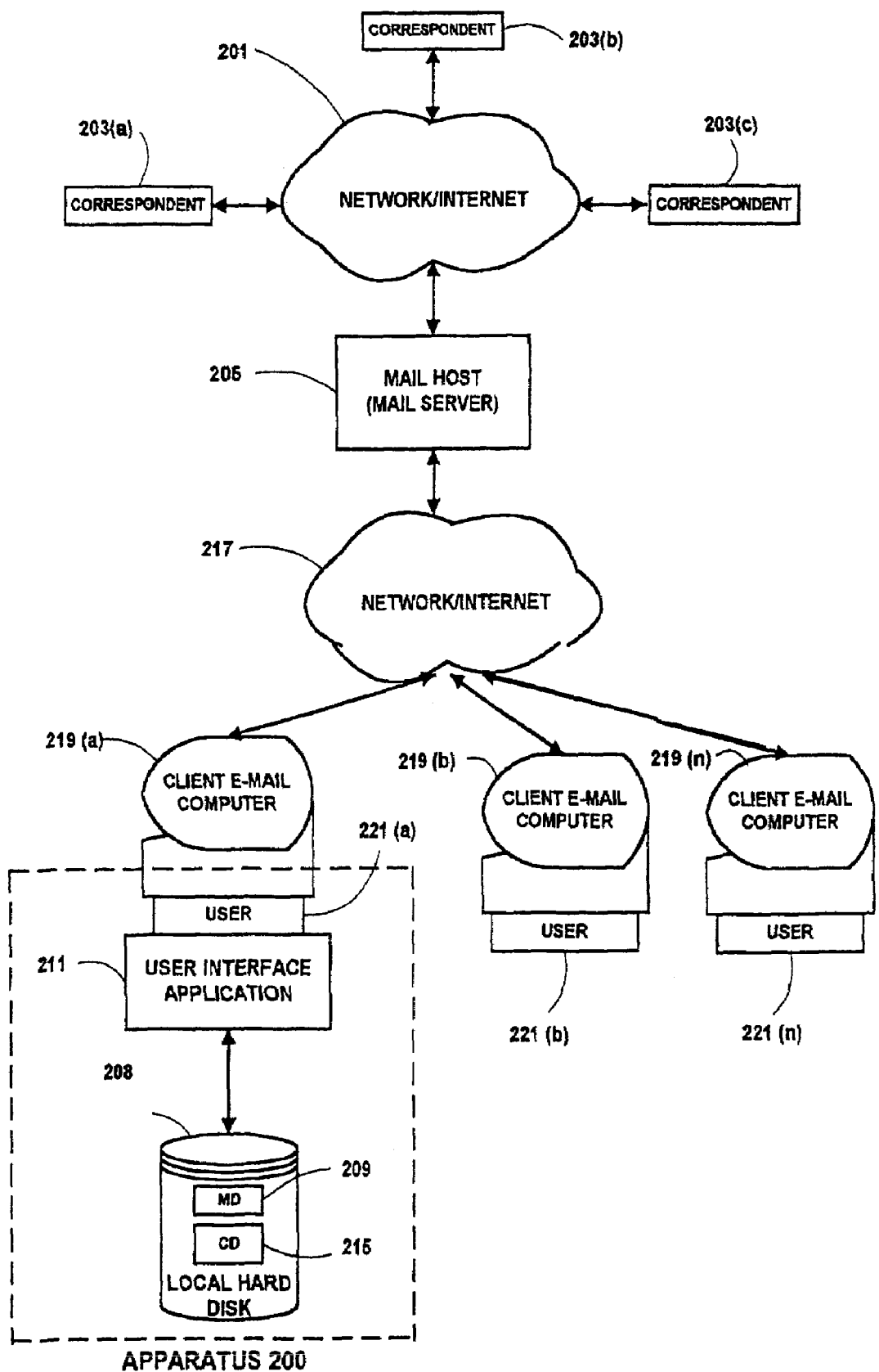
FIG. 2 shows a high-level block diagram of the apparatus for another embodiment of the invention.

FIG. 2 shows a high-level overview of another embodiment of the invention, shown as apparatus 200. This embodiment assumes that e-mail users will have an e-mail software which embodies the invention installed on their local computer. (more about this below).

Most of the components of FIG. 2 are similar to those of FIG. 1, and are labeled with the same numbers except that the first digit is "2" instead of "1". The principal difference between FIG. 2 and FIG. 1 is that in FIG. 2 the invention resides at the user's local computer (see apparatus 200), instead of at the host or server computer level (as in apparatus 100).

In FIG. 2 incoming e-mail comes to mail host 205, and is transmitted through network 217 to user 221's client e-mail computer 219, as would typically happen without the invention in traditional e-mail systems. In apparatus 200, the user interface application 211 resides on client e-mail computer 219, incorporated into the local e-mail client software. User interface application 211 otherwise performs the same functions as user interface application 111. In apparatus 200 message data store 107 and correspondent data store 113 (from apparatus 100) are combined into local hard disk 208, which contains message data store 209 and correspondent data store 215 for a single user, rather than for multiple users 109 (*a* . . . *n*) and 115 (*a* . . . *n*) in 107 and 113 in apparatus 100.

FIG. 3 shows one embodiment of a data table for correspondent information to be contained in correspondent data store 115 (*a* . . . *n*) or 215. The top entry in each column in the table in FIG. 3 describes the category of information maintained about each correspondent 103 or 203 with whom users 121 (*a* . . . *n*) or user 221 corresponds. Each subsequent line in the table describes the specific information for each of correspondents 103 (*a* . . . *n*) or 203 (*a* . . . *n*).

Figure 4:
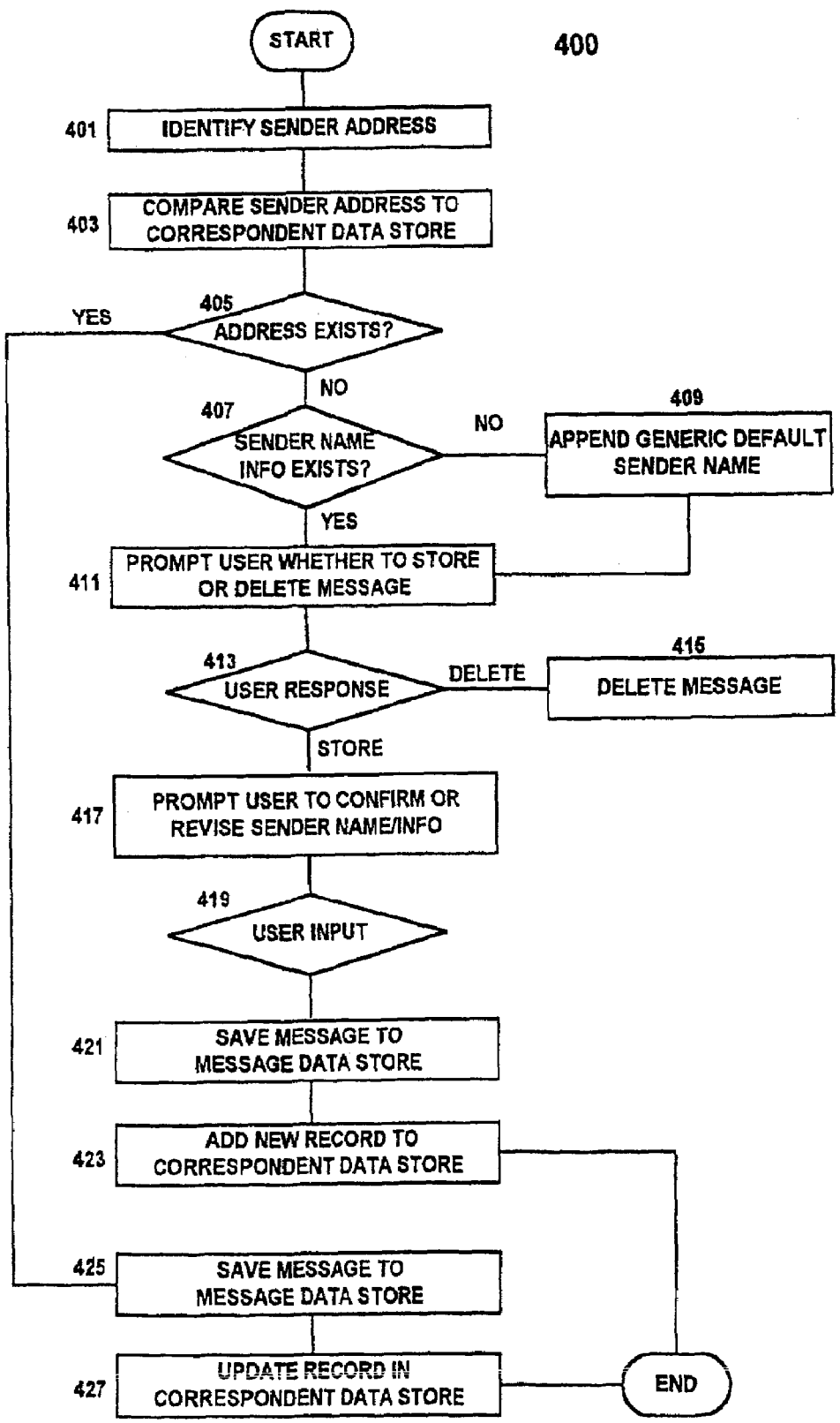
FIG. 4 is a flowchart showing the processing of incoming messages.

FIG. 4 shows new message processing 400. For incoming messages, new message processing 400 is applied to each message to assure that, before saving the message to message store 109 (*a* . . . *n*) or 209, the message is linked to the appropriate correspondence record in correspondent data store 115 (*a* . . . *n*) or 215, and so that the correspondent data store record can be updated.

New message processing 400 starts after a message is received by mail host 105 or 205 and has been transmitted by the mail host to user interface application 111 or 211. We will assume here that the new incoming message is addressed to user 121(*a*) or 221(*a*). Such message would have either been sent through network 101 or 201 from a correspondent 103 (*a* . . . *n*) or 203 (*a* . . . *n*), or alternatively from a user 121 (*b* . . . *n*) or 221 (*b* . . . *n*), transmitted through network 117 or 217. Upon receipt of this message, mail host 105 or 205 would transmit the message to user interface application 111 (in the case of apparatus 100) or through network 217 to user interface application 211 (in the case of apparatus 200). Upon receipt, user interface application 111 or 211 would begin new message processing 400.

In new message processing 400, user interface application 111 or 211 performs step 401, which is to identify and isolate the e-mail address of the message's sender. In this process user interface application 111 or 211 scans the field of the message which contains the sender e-mail address, to isolate the e-mail address from any additional text in the field. Then user interface application 111/211 performs step 403, comparing the sender's e-mail address to addresses in correspondent data store 115(*a*) or 215, to determine if there is a match.

If the result of step 405 is yes, user interface application 111/211 performs step 425 on the message, which is to save the message to the message data store 109(*a*) or 209, noting the number of the record in 109(*a*)/209 in which the message is saved, which record number will be used in step 427. The message is also marked as "in," reflecting that the message was incoming rather than outgoing. In step 427 the last four fields of the record identified in step 405 in the correspondent data store 115(*a*) or 215 (also shown in FIG. 3) are updated to reflect information resulting from saving the new message to message data store 109(*a*) or 209. Process 400 is then complete.

However, if the result of step 405 is no, user interface application 111/211 begins step 407. In step 407 user interface application 111/211 again scans the message fields to determine if there is information to guess the name of the sender. For example, the name of the sender is often included within <. . . > brackets in the sender e-mail address field. If the answer to step 407 is yes, this information is temporarily stored as default sender name. Otherwise, step 409 is applied to temporarily store a generic sender name (such as "unrecognized sender," or "?") as the default sender name for the message.

Step 411 then prompts the user whether he/she wants to store or delete the message. (In making this decision the user can optionally read the text of the message.) If the user response in step 413 is "delete," step 415 deletes the message.

If the user's response in step 413 is "store", user interface application 111/211 proceeds to process step 417.

Step 417 displays the currently stored default sender name for the message in a text box which can be revised by the user. Step 417 also asks the user to perform step 419, in which the user either accepts the default sender name, or revises it and confirm the revision.

The user interface application 111/211 then performs step 421, which is to save the message to the message data store 107, noting the record number of the newly saved record, which will be used in step 423.

In step 423 a new record is created in the correspondent data store 115(a) or 215 (see also FIG. 3). This record will be associated with all subsequent incoming or outgoing messages to or from this sender. This information for the six fields listed in the correspondent table in FIG. 3, will be: (1) "correspondent name": the user-confirmed sender name for this message from step 419; (2) "e-mail address": the sender's e-mail address (previously identified for the message in step 401); and (3) "links to msgs. in msg database": the record number in which the instant message was just stored in the message data store 109(a) or 209; (4) "# of messages in database": in this case "1" (since this is the first message); (5) "last message type (in or out)": "in" (since this was an incoming message); and (6) "date of last correspondence": the date/time of the instant message will be inserted. 400 is then complete.

FIGS. 5-8 are user screens made possible by the invention, and in particular the automated maintenance of the table in FIG. 3, reflecting the information maintained in correspondent data stores 115 and 215.

FIG. 5 shows an example of the initial e-mail screen seen by a user of the preferred embodiment. The first table 500 shows a summary of all pending e-mail not yet responded to by the user. The two lines in 503 show two messages which have been recognized as potentially junk mail because the sender's identifying information was not contained in the correspondent table in FIG. 5. Option 505 allows the sender to automatically delete these two messages from unrecognized senders.

FIG. 6 shows the user screen seen when the user clicked on the first line in table 500, line 501. Note that the user sees not only the message from the sender indicated in 501, but he also sees past incoming and outgoing correspondence, in reverse chronological order, with that sender.

Figure 7:
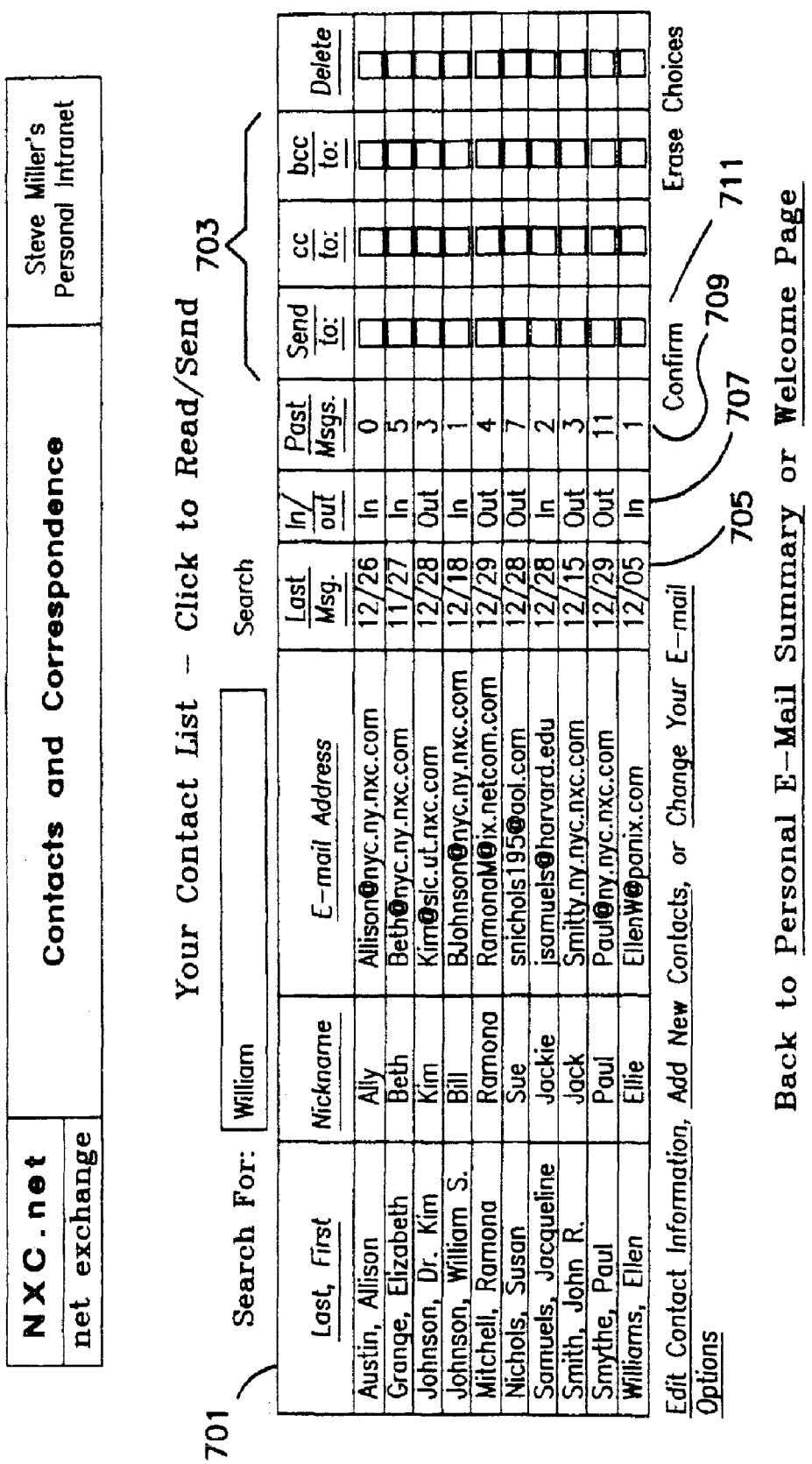
FIG. 7 is a user screen showing aggregate correspondent information and options for all correspondents on the "Contacts and Correspondence" screen for the preferred embodiment.

FIG. 7 shows the screen the user sees when he clicks on line 507 in FIG. 5. The user can instantly open a pre-addressed e-mail screen to communicate with any user in column 701 by clicking on the user's name. The user can open an e-mail window pre-addressed to multiple users by clicking on boxes in the three columns in 703, then clicking on the confirm button 711 below. Note also that the user can see the date of his last incoming or outgoing message with each correspondent by looking in column 705. Further, the user can see whether that message was incoming or outgoing by looking in column 707. And the user can also see how many previous incoming or outgoing messages are on file for each correspondent by looking in column 709. Each of these capabilities are made possible by referencing the information in the table in FIG. 3, reflecting correspondent data stores 115 for the respective user, or 215.

FIG. 8 shows a user screen which can be used to eliminate junk mail. This screen is one of the options available by clicking on 509. Notice that this screen lets users change their e-mail address and select which of their correspondents will be able to send e-mail to the new address. Certain correspondents—in this case those using the same e-mail provider as the user—will need take no action, and future messages sent by such correspondents to the user will automatically be routed directly to the user. The remaining correspondents—those using a different e-mail provider from the user—will receive an e-mail notification that the user's e-mail address has changed, so that they can redirect subsequent messages to the user's new e-mail address.

FIG. 9-A is a high-level system architecture diagram of the invention apparatus. As shown in FIG. 9-A, an Incoming Message is being communicated via a signal transmitted over a limited number of transport media (e.g. e-mail, voice, Fax, or any other way of communication). Depending on the transport media, a message could be delivered to one (or more) Incoming Message Server(s) (903). The function of the Incoming Message Server is to convert the media-dependent message into a common message object (Diagram 9-H) that is communicated internally in the system.

The Message Object represents the information contained in the message string. However in a more readable format Using this format, it is easier to the system to handle logic decisions in a fraction of the time required to re-scan the message every time searching for a field.

After a Message has been converted to a Message Object, the incoming Message Server (903) sends the object to one of one (or more) identical Queue Manager servers (907). The function of the Queue Manager is to sort messages according to a given priority algorithm, then send them one at a time to the Mass Storage Server (909). If one Queue Manager server becomes overloaded, some of the objects on this server will migrate to another Queue Manager server according to a given algorithm.

Mass Storage is where all data and system information is stored, searched, and updated through Queue Manager servers (907) and Application Servers (913)

An Application Server is responsible for providing transformations upon Message Objects moving between User Interface Servers (915) on one hand, and the Mass Storage Server (909) and Outgoing Queue Manager servers (917) on the other hand. Also, the Application Server communicates with a State Server (913) to temporarily store current login information about a specific user. The State Servers (913) and Application Servers (911) together provide a way of keeping track of user activity or state during a given session. The State is stored for a limited amount of time before being discarded.

The User Interface Servers provide a way for users (Customers) to handle input/output operations. Through communication with the Application Server (911), a user can get access to only his/her information on the Mass Storage Server (909).

After a user composes a message through User Interface Servers (915), the message is passed to the Application Server (911), which will, in turn, pass it in the form of a Message Object to the Outgoing Queue Manager (917). The Outgoing Queue Manager is responsible for maintaining this object sorted among other objects according to a priority determined by a given algorithm. Sending the object to the Outgoing Message Server, which will, in turn, send an Outgoing Message (919) as a communicated signal transmitted over a limited number of transport media (based on user choice).

If one Outgoing Queue Manager server becomes overloaded, some of the objects on this server will migrate to another Outgoing Queue Manager server according to a given algorithm.

The Firewall (905) blocks connection from the outside world, preventing direct access to servers inside it. The firewall allows only the Incoming Message Server (903), the User Interface Server (915), or an Outgoing Message Servers (917) to communicate with the protected servers inside the firewall, thus providing a high level of security for data stored on the Mass Storage (909).

FIG. 9-B shows the internal structure of the Incoming Message Server (903). As shown in FIG. 9-B, the Incoming Message (901) is delivered to a Device-Specific Driver/Daemon (931) which handles transport media-dependent incoming messages according to their media (e-mail SMTP daemon, Fax Receiver, etc.).

After being converted to a stream, file, or other standard input forms, the Message is passed to a Local Delivery Agent (933), which receives a request from a Device-Specific Driver (931) to deliver a message to the local machine users. A local delivery agent converts the message from media-dependent to a stream format, and sends that to a Message Parser (935).

The Message parser 935 converts the message stream to a media-independent message object.

Through parsing, the message key fields are extracted from message headers and stored in message object properties (attributes) to be accessed by other system components. After the message object has been populated with data, it is then sent to an Object Trading Layer (937) which is responsible for delivering a given message object to the least loaded Queue Manager server (907) according to work load statistics provided by the Queue Managers (907)

FIG. 9-C shows the internal structure of the Queue Manager Server (907). As shown in FIG. 9-C, the Object Trading/Migration Layer (941) communicates with an Object Trading layer (937) of the Incoming Message Server (903). Both layers work to deliver Message Objects with embedded message information. The Migration Layer delivers objects to the next unloaded Object Queue Manager server, in case the Object Queue Manager (943) is overloaded or failing.

The Object Queue Manager 943 holds Message Objects in a dynamic data structure sorted by priority for delivering the message. Whenever the Object Queue Manager becomes overloaded, it decides according to a given algorithm which objects should be migrated to the next available Object Queue Manager (907) and sends a request to the Object Migration layer (941) to carry on the object migration process.

When the Object Queue Manager (943) decides an object is next to be delivered, it passes the object to an Insertion Module (945), which interacts with the Mass Storage Server (909) to store the message. The Insertion Module (945) contains the decision logic for inserting the Message Object according to the type of mailbox to which the message was directed The Insertion Module (945) does not know anything about mass storage structure, tables, or field names. Instead, it sends a series of remote method invocations to the Mass Storage Interface (951), which in turn knows how to deal with the internal structure of the Mass Storage.

FIG. 9D shows the internal structure of the Mass Storage Server (909). As shown in FIG. 9D, a Mass Storage Interface 951 provides high level methods that will be called by the Object Insertion Module (945) through RMI (Remote Method Invocation) to store Message Objects. The Mass Storage Interface 951 is the responsible for the actual communication with the Mass Storage Server, also referred to as the Database (953). The Mass Storage (953) is the actual location for storing and manipulating users' Messages, Correspondents, and Topic information. See FIG. 9-F for details on the entity relationship diagram of the database.

FIG. 9E shows the internal structure of the Outgoing Queue Manager/Message Server (917).

As shown in FIG. 9E, an Object Trading/Migration Layer (961) communicates with the Object Trading Layer of the Application Server (911). Both layers work to deliver Message Objects with embedded outgoing message information.

The Migration Layer communicates with the Object Queue Manager (963) to deliver objects to the next unloaded Queue Manager. The Object Trading/Migration Layer (961) passes the message to an Outgoing queue Manager (963) which holds Message Objects in a dynamic data structure sorted by priority for sending the message. Whenever the Object Queue Manager (963) becomes overloaded, it decides which objects should be migrated to the next available Queue Manager (917) according to a given algorithm, and sends a request to the Object Migration Layer (961) to carry out the object migration process. The Object Queue Manager (963) passes Outgoing Messages (919) to a Message Sending Module (967) which reconstructs a media-dependent message from the generic Message Object, and sends the resulting Media-dependent Message through Device-Specific Drivers (967).

Device-Specific Drivers (967) transports media-dependent Outgoing Messages according to their media (e-mail SMTP daemon, Fax Sender, etc.).

FIG. 9-F is a high level entity relationship diagram for Mass Storage 953. The diagram represents the relation between entities on a conceptual level. Each block in the diagram represents a structured "data table" (also called a "message store" or "database"). These data tables are comprised of records, each containing "fields" of information. (Records are similar to rows in a spreadsheed, where as fields are similar to the columns in a spreadsheet, with the column headers in spreadsheets being similar to the record identification name for the information contained in the column.)

FIG. 9-G is lower level entity-relationship diagram. The blocks shown in 9G represent the same data tables as those in FIG. 9-F, with the only difference being that in 9G each block contains additional description about the information stored within the data table represented by that block.

In both 9F and 9G, lines 999 connecting pairs of data tables indicate that those two tables are "related," which means that the records in one data table may be linked to records in the other. The connecting points of these lines sometimes fork into three prongs, which indicates that multiple records from a table so marked may be linked to a single record in the related table—a "many-to-one" relationship. the relationship is also indicated by the digits "m" (many) or "1" (one) next to the point where each relationship line intersects with a block representing a table.

The block or data table numbers in 9F and 9G are identical, except that the data tables in 9G are labeled with a "'" symbol (e.g., data table 985' in FIG. 9F is labeled 985' (with an apostrophe) in 9G.

As shown in FIG. 9-G, User table (985) maintains information about each user of the invention. User ID is a unique identifier for that user. Other information in the User table 985 includes but is not limited to, User first name, user last name, and user password for system logins.

A User will have at least have one E-mail Box, (i.e. an e-mail address which belongs uniquely to such User). In this E-mail Box the user receives incoming messages addressed to his E-mail Box, and from this E-mail Box the-User sends outgoing messages. Note that an E-mail Box is like one's personal postal mailing address. Just like in the physical world a person can have more than one mailing address (e.g. home and business), a User of the Invention can have more than one E-Mail Box or personal e-mail address. In fact the Invention makes it easier to manage multiple E-Mail Boxes, as is further discussed herein. Note, therefore, that there is a one-to-many relationship between the User data table and the E-Mail Box data table. The relation between Users and their E-Mail Boxes is maintained in the E-Mail Box data table 987.

The E-Mail Box data table 987 also contains fields for storing other information relating to each of the Users' E-Mail Boxes, such as an arbitrary title the users may name their E-Mail Box and also an identifier for E-Mail Box type. Types of E-Mail Boxes which the invention uses included Trusted (meaning the address is used only for correspondence with correspondents E-Mail Box 987. The minimum information which about each correspondent which is maintained in the User-Correspondent data table is the correspondent's e-mail address. Other information about correspondents in the User-Correspondent data table may include first and last name, description, comments, phone, address, etc.

Note that Correspondent data table 989 embodies several key innovations in the Invention. (1) Whereas in the prior art, each e-mail address on an e-mail address list must be consciously entered by the user, in the Invention the Correspondent data table becomes an e-mail address list, and the system automatically creates posts an entry to the Correspondent data table for any message sent to or accepted from a correspondent not already contained in the Correspondent data table (see more about this process in FIGS. 10A, 10B, and 10C below). This feature greatly simplifies the task of keeping track of e-mail addresses. (2) Correspondent data table 989 can maintain additional information about correspondents, which can be displayed in helpful ways. For example, while prior art messages often come from a sender whose identity is not readily recognizable, a User of the Invention can identify a name or descriptive term for each correspondent, so that upon receiving a message from something like as ixam5@domain.com, the system will inform the User that the message is from RealName@domain.com. (3) The Correspondent data table gives the Invention a completely new and powerful way to identify and deal with junk e-mail. Where as all junk-mail filtering systems to date are "negative filters" (i.e., they search for information within a message to be used to identify the message as bad), our Invention provides a powerful "positive" filter—i.e., we can identify all incoming messages received from a correspondent on our Correspondent data table, and automatically mark all other incoming messages as suspect.

All messages, whether incoming or outgoing, are stored in Message data table 993, which is similar to Message Data Stores 107 and 209. For each incoming or outgoing message which User has sent or received to/from any Correspondent from a given User E-Mail Box, Message data table 993 contains all the message information contained in the original Internet-standard e-mail message (defined by the SMTP message protocol described in the "Background of the Invention" above); however within a Message data table record all the "header" the information (as defined by SMTP) is stored in a single field of the record, and also all header information has been parsed and stored separately. All header information except the sender and receiver information is stored in specific fields within the Message data table record; the sender/receiver information, however, is stored in the Message-Correspondent Relationship data table, which is described below.

The Message-Correspondent Relationship data table 995 is the repository for links between messages stored in the Message data table 993 and correspondents stored in the Correspondent data table 989. Each record in the Message-Correspondent Relationship data table 995 will contain pointer information to a single message in Message data table 993 and a single correspondent in Correspondent data table 989.

Note that the Message-Correspondent Relationship data table 995 is a key innovation in the Invention. Whereas in prior art e-mail systems at least one instance of a message must be stored on a computer somewhere for every party to a message (i.e. the sender and each address), in the Invention the message is stored only once, without regard to the number of parties to the message. The Invention accomplishes this result by replacing the prior art's multiple instances of the same message, with a single copy of the message, and multiple instances of only short pointer records, which are stored in the Message-Correspondent Relationship data table 995.

Another key innovation of the Invention which is embodied in the Message-Correspondent Relationship data table 995 is that the Invention can automatically link all messages to and from a given correspondent. This facilitates unique reports such as FIGS. 6, as well as columns 705, 707, and 709 in FIG. 7.

Topic data table 991 represents topics which users can create to categorize their messages, so that it is easier to retrieve messages when they are needed in the future. This table contains a list of all topics which a User has created for incoming and outing messages pertaining to to Email Box 987.

Message-Topic Relationship data table 997 is a repository for links between messages stored in Message data table 993 and topics stored in the Topic data table 991. Each record in the Message-Topic Relationship data table 997 will contain pointer information to a single message in Message data table 993 and a single topic in Topic data table 991.

Note that the Message-Topic Relationship data table 997 is another key innovation in the Invention. Whereas in prior art e-mail systems at least one instance of a message must be stored on a computer somewhere for every folder in the prior art stores a message, in the Invention the message is stored only once, without regard to the number of topics (analogous to folders) to the message is related. The Invention accomplishes this result by replacing the prior art's multiple instances of the same message in multiple "folders" or files, with a single copy of the message and multiple instances of short pointer records stored in Message-Topic Relationship data table 997.

Also note that the database structure of the Invention, including the date tables described in FIGS. 9F and 9G make it possible to solve various other problems with the prior art, including all of the 19 problems listed at the end of the "Background of the Invention" section above.

FIG. 9-H is an object relation diagram which describes the structure of the Message Object. The Message Object represents the information contained in the message string, however in a more readable format. Using this format, it is easier for the system to handle logic decisions in a fraction of the time required to re-scan the message every time searching for a field.

As shown in FIG. 9-H, the Message Object (1101) is composed of a set of properties, and two vectors (dynamic arrays). The first vector is the recipient vector (1103) which contains a number of recipient objects (1105). The second vector is the attachment vector (1107) which contains a number of attachments object (1109).

The Properties of Message Object (1101) includes.

| | |
|---|---|
| CharSet | Character set used to compose the |
| MessageHeader | Contain complete header of the message |
| SubType | Content Subtype |

-continued

| Type | Content Type |
|---|---|
| Date | Date Message was sent |
| FromFirstName | Senders First Name |
| FromLastName | Senders Last Name |
| FromAddress | Senders e-mail address |
| MessageID | Message Universal unique ID |
| MessageBody | Contain body of message |
| Priority | Message priority |
| ReplyToName | Reply to name |
| ReplyToAddress | Reply to E-mail address |
| Subject | Message Subject |
| MimeVersion | Contain information about MIME format |

The properties of Recipient Object (1105) includes.

| Address | E-mail address |
|---|---|
| First Name | First Name of |
| Last Name | Last Name of |
| Type | Type of the |

The properties of Attachment Object (1109) includes.

| AttachmentBody | Encoded attachment |
|---|---|
| SubType | content subtype |
| Type | content type |
| Description | Description of the attachment, fetched from |
| Encoding | Encoding type (e.g. base64 x-uuencode) |
| FileName | File Name of attachment |
| Size | Size of encoded attachment |

FIGS. 10-A and 10-B explain how the business logic applied to an incoming message. Step 1001 receives and parses different fields in the message string are converted to properties of a Message Object. The Message Object represents the information contained in the message string, however in a more readable format. Using this format, it is easier for the system to handle logic decisions in a fraction of the time required to re-scan the message every time searching for a field.

Step 1003 parses the message string to convert the message string to a Message Object. Having the message object populated with key fields, step 1007 searches the database 971 and 985 to determine if the user e-mail address exists. If that address exists, then step 1009 further searches to retrieve user preferences that belong to that e-mail address. Based on the e-mail address type determined in step 1011, one of two directions will be chosen. Either the e-mail address could be an un-trusted e-mail address (i.e. used for web surfing or in correspondence with un-trusted correspondents), or the e-mail is a trusted e-mail address (i.e. used in correspondence with trusted correspondents).

In case of an un-trusted e-mail address, the database is searched in step 1013 for a matching correspondent address in the correspondent data store (989 of FIG. 9-G) if the correspondent address exists, then the message is saved in step 1015 into the message data store 993 of FIG. 9-G, the relation between the user, correspondent and the message is stored by step 1017 in the Message-Correspondent data store 995 of FIG. 9-G.

However if the correspondent address does not exist in the correspondent data store, then step 1019 prompts the user to either store or delete the message. If the user response was to delete the message, then step 1031 deletes the message from the message data store.

If the user response is to store the message, step 1023 prompts the user to either accept or revise the user information before being stored in the correspondent data store. Step 1029 stores the message in the message data store and the relation between the user, correspondent and the message is stored by step 1029 in the Message-Correspondent data store.

Trusted e-mail is processed as shown in FIG. 10-B. First, step 1051 searches the database is searched for a matching sender address in the correspondent data store. If the address exists, then step 1053 saves the message in the message data store, the relation between the correspondent, the user and the message is stored in step 1055 in the Message-Correspondent data store.

However if the sender address does not exist in the correspondent data store then based on the user preferences information as determined in step 1057 (retrieved from the database in step 1009) one of the following options may be selected by the user in Step 1059.

1—If the user chooses in step 1061 to flag messages coming from correspondents not in correspondent table as unrecognized correspondents, this will be highlighted to the user and choice of deleting all flagged messages will be offered to him/her. Then, step 1063 prompts the user to either store or delete the message. If the user response determined in step 1065 was to delete the message, then the message is deleted from the message data store. Otherwise the user response is to store the message, the user is requested by Step 1067 to either accept or revise sender information before being stored in the correspondent data store. The message is stored in message data store and the relation between the user, the correspondent and the message is stored by step 1071 in the Message-Correspondent data store.

2—The user chooses by step 1077 to send the message back to the correspondent with a message stating that user does not exist on the server (bounce the message back).

3—The user chooses by step 1079 to forward the message to another e-mail address.

FIG. 10C explains the business logic applied to an outgoing message. When user sends a message to the system as shown in FIG. 10C, the message is parsed in step 1083 and a Message Object is created. The Message Object represents the information contained in the message string, however in a more readable format. Using this format, it is easier to the system to handle logic decisions in a fraction of the time required to re-scan the message every time searching for a field.

Having the message object populated with key fields, step 1087 makes a search in the database to determine if the correspondent e-mail address exists in the Correspondent data store. If that address exists, then the message is saved by step 1089 to the message data store, the relation between the user, the correspondent and the message is stored in step 1091 in the Message-Correspondent data store.

If the recipient address was not found in the correspondent data store, then the user is requested by step 1093 to either accept or revise recipient information before being stored by step 1095 in the correspondent data store. The message is stored by step 1099 in message data store and the relation between the user, correspondent and the message is stored by step 1097 in the Message-Correspondent data store.

FIGS. 11 A to D show the format used for exchanging information between the user and the apparatus over Internet 101/117. As Shown in FIG. 11A, a request for retrieving a message (1201) includes a customer id, customer e-mail address id, contact e-mail address and message id. Every two fields are separated by a separation indicator (-).

As shown in FIG. 11B, a block (1203) shows a correspondent information request. The request includes a customer id, customer e-mail address id and correspondent e-mail address. Every two fields are separated by a separation indicator (-).

As shown in FIG. 11C, block (1205) shows a correspondent message history request. The request includes a customer id, customer e-mail address id and contact e-mail address. Also 2 counter fields are presented, count 1 is used to indicate the number of messages needed to be displayed in detailed format, count 2 is used to indicate the number of messages needed to be displayed in summery format. Every two fields are separated by a separation indicator (-).

As shown in FIG. 11D, block (1207) shows a topic content request. The request includes a customer id, customer e-mail address id and topic id. Also 2 counter fields are presented, count 1 is used to indicate the number of messages needs to be displayed in detailed format, count 2 is used to indicate the number of messages needed to be displayed in summery format. Every two fields are separated by a separation indicator (-).

CONCLUSION

The invention operates by taking a novel approach to e-mail from the approach in use today. Current e-mail systems, including the user interfaces they provide, take a message-centric approach to e-mail—e-mail is sorted, stored, and shown in an exclusively message-centered way, with no attention to helping the user keep track of correspondent-centered information. The invention lets the user add and maintain correspondent-centered information to the e-mail system, and take advantage of the various user-interface and privacy benefits that this approach offers.

What is claimed is:

1. A system for managing a plurality of messages which are sent and/or received by one or more correspondents, said system comprising:
   one or more data structures that store data representing (i) individual instances of at least a portion of each of the a plurality of messages; (ii) correspondent records, including information related to the one or more correspondents of the plurality of messages; (iii) message-correspondent information that links each unique instance of the individual messages with one or more correspondents of that message;
   one or more modules that are operable to analyze each of the plurality of messages in order to (i) identify the individual instances of the one or more portions of the individual messages in the plurality of messages, and (ii) generate the message-correspondent information;
   wherein the one or more modules are configured to:
   (i) identify one of an incoming or an outgoing message to identify at least a select portion of that message,
   (ii) determine whether the at least select portion of the incoming or outgoing message matches an individual instance of at least the portion of one of the plurality of messages, and
   (iii) responsive to the at least select portion of the message matching the individual instance of the at least portion of the one of the plurality of messages, performing at least one of:
      (a) discarding the at least select portion of the message, or
      (b) identifying a correspondent of the incoming or outgoing message and storing message correspondent information that links the identified correspondent to the matching individual instance; and
   wherein the one or more modules cause the identified unique instances of the individual messages and the generated message-correspondent information to be stored in the one or more data structures.

2. The system of claim 1, wherein the one or more data structures are each relational.

3. The system of claim 2, wherein the one or more data structures include a first data structure that stores the unique instances of individual messages in the plurality of messages, a second data structure that stores the correspondent records, and a third data structure that stores the message-correspondent information.

4. The system of claim 3, wherein the first data structure corresponds to a first set of one or more tables, the second data structure corresponds to a second set of one or more tables, and the third data structure corresponds to a third set of one or more tables.

5. The system of claim 1, wherein the at least portion of the incoming or outgoing message is an attachment.

6. The system of claim 1, wherein the one or more modules operate on only one of incoming messages or outgoing messages.

7. The system of claim 1, wherein the one or more modules scan one of an incoming or an outgoing message based on a pre-determined format for how a message is to be structured.

8. A system for managing a plurality of messages which are sent and/or received by one or more correspondents, said system comprising:
   one or more data structures that store data representing (i) individual instances of at least a portion of each of the a plurality of messages; (ii) correspondent records, including information related to the one or more correspondents of the plurality of messages; (iii) category designations that identify one or more categories, from a plurality of categories, of the individual instances of at least the portion of each of at least some of the plurality of messages; (iv) message-correspondent information that links each unique instance of the individual messages with one or more correspondents of that message; (v) other information that links each instance of the individual message with a category designation that identifies at least one category for that instance;
   one or more modules that are operable to analyze each of the plurality of messages in order to (i) identify the individual instances of the one or more portions of the individual messages in the plurality of messages, (ii) generate the message- correspondent information, and (iii) record the other information;
   wherein the one or more modules are configured to sort at least a set of the plurality of messages by both (i) a correspondent of each of the messages in the set, using the message-correspondent information for individual messages in the set, and (ii) a category designation of each of the messages in the set, using other information recorded for individual messages in the set:
   wherein the one or more modules cause the identified unique instances of the individual messages and the generated message-correspondent information to be stored in the one or more data structures.

* * * * *